United States Patent
Boyless et al.

(10) Patent No.: US 10,778,942 B2
(45) Date of Patent: Sep. 15, 2020

(54) SYSTEM AND METHOD FOR DYNAMIC AND CENTRALIZED INTERACTIVE RESOURCE MANAGEMENT

(71) Applicant: Metcalf Archaeological Consultants, Inc., Lakewood, CO (US)

(72) Inventors: Nathaniel David Boyless, Denver, CO (US); Dante Lee Knapp, Arvada, CO (US)

(73) Assignee: Metcalf Archaeological Consultants, Inc., Lakewood, CO (US)

( * ) Notice: Subject to any disclaimer, the term of this patent is extended or adjusted under 35 U.S.C. 154(b) by 0 days.

(21) Appl. No.: 16/258,203

(22) Filed: Jan. 25, 2019

(65) Prior Publication Data
US 2019/0238801 A1 Aug. 1, 2019

Related U.S. Application Data

(60) Provisional application No. 62/623,341, filed on Jan. 29, 2018.

(51) Int. Cl.
*H04N 7/00* (2011.01)
*H04N 7/18* (2006.01)
(Continued)

(52) U.S. Cl.
CPC .......... *H04N 7/183* (2013.01); *G06F 16/27* (2019.01); *H04L 47/82* (2013.01);
(Continued)

(58) Field of Classification Search
CPC .............. H04N 7/183; H04N 5/23206; H04N 5/23238; H04N 5/265; H04N 7/18; G06F 16/27; H04L 47/82

(Continued)

(56) References Cited

U.S. PATENT DOCUMENTS 5,930,773 A * 7/1999 Crooks ................. G06Q 10/06
705/30
6,094,625 A 7/2000 Ralston
(Continued)

FOREIGN PATENT DOCUMENTS

WO WO 2004/044525 5/2004
WO WO 2017/215899 12/2017

OTHER PUBLICATIONS

International Searching Authority, International Search and Written Opinion, dated Apr. 11, 2019 in PCT/US2019/15321.
(Continued)

*Primary Examiner* — Jayanti K Patel
*Assistant Examiner* — Richard B Carter
(74) *Attorney, Agent, or Firm* — Critical Path IP Law, LLC

(57) ABSTRACT

Systems and methods for interactive site resource management are disclosed. In certain embodiments, the system and method collects and accesses local geospatially-referenced landscape and site survey data in the field as facilitated by selectable content views, the gathered landscape and site survey data synthesized with baseline geospatially-referenced landscape and site survey data. In one aspect, the synthesized landscape and site geospatially-referenced survey data may be used by a project lead or authority agent, to create a landscape and/or site report, an authorized development plan, a master landscape and/or site survey, and/or as-built development plans. In certain embodiments, the synthesized landscape site survey data is presented as an augmented reality display.

20 Claims, 15 Drawing Sheets

(51) Int. Cl.
*H04L 12/911* (2013.01)
*G06F 16/27* (2019.01)
*H04N 5/265* (2006.01)
*H04N 5/232* (2006.01)

(52) U.S. Cl.
CPC ..... *H04N 5/23206* (2013.01); *H04N 5/23238* (2013.01); *H04N 5/265* (2013.01); *H04N 7/18* (2013.01)

(58) Field of Classification Search
USPC .............................. 348/38; 455/557; 705/30
See application file for complete search history.

(56) References Cited

U.S. PATENT DOCUMENTS

| | | | |
|---|---|---|---|
| 7,301,547 B2 | 11/2007 | Martins | |
| 8,180,396 B2* | 5/2012 | Athsani | G06F 3/011 |
| | | | 455/557 |
| 8,773,465 B2 | 7/2014 | France | |
| 9,196,094 B2 | 11/2015 | Ur | |
| 9,571,644 B2 | 4/2017 | Steiner | |
| 9,652,896 B1 | 5/2017 | Jurgenson | |
| 10,037,627 B2 | 7/2018 | Hustad | |
| 2006/0152589 A1 | 7/2006 | Morrison | |
| 2010/0283864 A1 | 11/2010 | Kawai | |
| 2012/0127161 A1 | 5/2012 | Wallbom | |
| 2015/0170256 A1 | 6/2015 | Pettyjohn | |
| 2016/0337773 A1 | 11/2016 | Tsilfidis | |
| 2017/0039765 A1 | 2/2017 | Zhou | |
| 2017/0046877 A1 | 2/2017 | Hustad | |
| 2017/0124713 A1* | 5/2017 | Jurgenson | G06K 9/78 |
| 2017/0293297 A1* | 10/2017 | Kim | G08C 17/02 |
| 2018/0286098 A1 | 10/2018 | Lorenzo | |
| 2018/0300552 A1 | 10/2018 | Lorenzo | |

OTHER PUBLICATIONS

A Motion-Stabilized Outdoor Augmented Reality System, Azuma et al, Proceedings of IEEE Virtual Reality '99, Houston, TX, Mar. 13-17, 1999.

Sensor Fusion for Augmented Reality, Hol et al, Report No. LiTH-ISY-R-2765, 9th International Conference on Information Fusion, Florence, Italy, 2006.

* cited by examiner

601 — Filing Date: 06/01/2017

| Resource Name | Project Name | Site Categories | Boundary Description | Site Dimensions |
|---|---|---|---|---|
| Magic Mountain | Excavations at Magic Mountain | Prehistoric Archaeological Site | Extent of artifacts and features visible on the surface | 105m x 82m |

| Component | Type | Site | Feature Type | Lat/Long | Altitude | Attachments | Notes |
|---|---|---|---|---|---|---|---|
| Precontact | Ceramic | Magic Mountain Site | Point | 39.713532° N, 105.212142° W | 1909.0 m | Photo | May have been used for cooking |

621 — Access Date: March 15, 2018

| City | Rain | Snow | Sunny Days | Summer High | Winter Low |
|---|---|---|---|---|---|
| Golden | 48.26 cm | 167.64 cm | 242 | 86 °F | 18 °F |

622 — 623 — 624 — 625 — 626 — 627

630 →

| Site | Period | Archaeologist | Organization | Notes |
|---|---|---|---|---|
| Magic Mountain Site | 1959-1960 | Cynthia Irwin-Williams | Peabody Museum of Harvard University | Three burials were found. Her findings were published in a book with her brother, Henry J. Irwin in 1966. |

Access Date: March 16, 2018

| Scientific Name | Common Name | Global Rank | CO State Rank | Federal Sensitive | CO State Sensitive |
|---|---|---|---|---|---|
| Haliaeetus leucocephalus | Bald Eagle | G5 | S1B, S3N | BLM/FS | ST |

| Map Title | Author(s) and Date | Map Scale | Downloadable File Formats | Notes |
|---|---|---|---|---|
| Geologic map of the Morrison quadrangle, Jefferson County, Colorado. | Scott, G.R., 1972 | 1:24,000 | PDF, GeoTiff, JPG, KMZ | Shapefile data currently not available for download. |

| Recording Year: 1914 — 661 | | | 666 |
|---|---|---|---|
| Name | Performer — 663 | People — 664 | Description — 665 | Attachment |
| Dance Faster — 662 | Fred Mart | Northern Ute | It is a modern song but its origin is like that attributed to songs in the old days | Audio |

| Channel — 682 | Publication Time — 683 | Title — 684 |
|---|---|---|
| KDVR | 11:14 AM, JUNE 18, 2018 | Golden's Magic Mountain archaeological site lets the public dig in, help archaeologists for free | ed landscape and site survey data used to update baseline
SYSTEM AND METHOD FOR DYNAMIC AND CENTRALIZED INTERACTIVE RESOURCE MANAGEMENT

CROSS-REFERENCE TO RELATED APPLICATION

This application is a nonprovisional patent application of and claims the benefit of U.S. Provisional Patent Application No. 62/623,341, filed Jan. 29, 2018 and titled "System and Method for Viewing, Analysis, and Data Collection of an Archaeological Operating Environment," the disclosure of which is hereby incorporated herein by reference in its entirety.

FIELD

The present invention is directed to a system and method for interactive resource management, such as interactive resource management involving archaeological sites, and the associated site surveying.

BACKGROUND

Existing approaches to resource management are segmented, not conducive to landscape-scale strategies and do not provide a complete representation of the resource landscape and site(s) of interest, resulting in, at best, stakeholder misalignment of resource management objectives and, at worst, mishandling of the resource site. Systems to assist with resource management do not allow selectable queries of resource-related content and data and are typically limited to queries of a traditional two-dimensional map.

What is needed is a system and method to allow query, interpretation, and collection or recording of geospatially-anchored content with an overlay/compare functionality to provide a rich and comprehensive view of a resource site. Such a system and method should enable onsite and offsite sensors to construct a comprehensive (i.e. immersive) three-dimensional world view for both onsite (and offsite) users. Furthermore, such a system would allow users to access offsite and/or supplementary data, and to construct a new view by recording new feature data. Such a system and method should further allow for merging existing and supplementary data with newly recorded data and incorporate all data into a newly constructed operating environment. Lastly, such a system and method should allow all stakeholders to share a common and comprehensive understanding of a resource landscape and site(s) throughout the resource's lifespan, to include landscape and site survey, data collection, resource evaluation, landscape and site development, report authoring, field monitoring, on-the-job training, and site maintenance and management. The disclosed system provides these capabilities and solves the above problems.

SUMMARY

The present disclosure can provide several advantages depending on the particular aspect, embodiment, and/or configuration.

Generally, a system and method are disclosed for interactive, centralized landscape and site resource management, the system and method gathering geospatially-referenced landscape and site survey data in the field as facilitated by selectable content views (aka selectable "lenses"), the gathered landscape and site survey data used to update baseline geospatially-referenced landscape and site survey data. The updated geospatially-referenced landscape and site survey data may be used by a project lead or authority agent (e.g. an agency archaeologist), in collaboration with a site developer and using selectable content views, to create a landscape and site resource report, an authorized development plan, an interpretive landscape plan and/or a master site and landscape survey. The authorized development plan and master site survey, as facilitated by selectable content views of the site, are used by the site developer and other stakeholders to execute site development and to document as-built development. The as-built development records are used by disparate stakeholders during the lifecycle management of the resource(s), to include inspection, verification, maintenance, management, evaluation and interpretation of changes to resources over time that may or may not be due to natural and/or human made causes.

Thus, a system and method for the seamless integration of pre- and in-field guidance, data collection, resource evaluation, report authoring, field monitoring, ongoing maintenance, job training and resource management is disclosed.

In one embodiment, a system for interactive resource management of a resource landscape and site is disclosed, the system comprising: a server database comprising a baseline dataset, the baseline dataset comprising baseline geospatially-referenced data; a remote site device comprising: a geolocation device configured to provide a location of the remote site device; a surveillance sensor configured to sense range and direction to a survey target and create surveillance sensor data; a local database comprising a local dataset, the local dataset comprising local geospatially-referenced data; and a user interface configured to populate the local database with the surveillance sensor data; a data synthesizer that combines the baseline dataset with the local dataset to create a synthesized dataset; and a renderer configured to present a plurality of views of the synthesized dataset on the user interface; wherein: the user may view the plurality of views of the synthesized dataset on the user interface to perform interactive resource management.

In one aspect, the remote site device further comprises a camera producing a camera view of the resource site on the user interface. In another aspect, the renderer presents a feature of the baseline geospatially-referenced data within the camera view to create an augmented reality view. In another aspect, the surveillance sensor is directed to the survey target by the user. In another aspect, the renderer presents an attribute associated with the survey target within the camera view to create an augmented reality view. In another aspect, one of the plurality of views of the synthesized dataset is a temporally-referenced view. In another aspect, one of the plurality of views of the synthesized dataset is a map-based view. In another aspect, one of the plurality of views of the synthesized dataset comprise a virtual-reality view or an augmented reality view.

In another aspect, one of the plurality of views of the synthesized dataset is an augmented reality view. In another aspect, the remote site device is further configured to record one or more of the plurality of views of the synthesized dataset. In another aspect, the remote site device is further configured to create an interactive map of the resource landscape and site(s) wherein the user comprises a user located at the resource site and/or a user located remote from the resource site. In another aspect, the baseline geospatially-referenced dataset comprises developer (e.g. site developer) plans associated with the resource landscape and/or site(s). In another aspect, the remote site device operates as a client and the server database operates as a server in a client-server software architecture. In another aspect, the user interface is further configured to receive input from the user to direct the surveillance sensor. In another aspect, the surveillance sensor comprises a spherical camera and the plurality of views comprise an augmented reality view and a virtual reality view.

In another embodiment, a method for interactive resource management of a resource location, e.g. a landscape and/or site(s), is disclosed, the method comprising: accessing a server database comprising a baseline dataset, the baseline dataset comprising baseline geospatially-referenced data associated with the resource landscape and/or site; providing a remote site device comprising a geolocation device, at least one surveillance sensor, a user interface, and a local database, the local database comprising local geospatially-referenced data; directing at least one surveillance sensor within the resource landscape and/or site to create surveillance sensor data; synthesizing the surveillance sensor data with the baseline dataset to create a synthesized dataset; and rendering the synthesized dataset on the user interface.

In one aspect, the synthesized dataset is rendered in a plurality of user-selectable views. In another aspect, the synthesized dataset is broadcast to a location remote from the resource site. In another aspect, the surveillance sensor is a plurality of sensors comprising a spherical camera.

In yet another embodiment, an interactive resource management system for an archeological resource location is disclosed, the system comprising: a server database comprising a baseline dataset, the baseline dataset comprising baseline geospatially-referenced data; a remote site device comprising: a geolocation device configured to provide a location of the remote site device; a plurality of surveillance sensors configured to sense range and direction to a survey target and create surveillance sensor data; a visible band camera; a local database comprising a local dataset, the local dataset comprising local geospatially-referenced data; and a user interface configured to receive input from a user to direct the surveillance sensor at the survey target and to populate the local database with the surveillance sensor data; a data synthesizer that combines the baseline dataset with the local dataset to create a synthesized dataset; and a renderer configured to present a plurality of views of the synthesized dataset on the user interface, the plurality of views comprising an augmented reality view and a virtual reality view; wherein: the user views the plurality of views of the synthesized dataset on the user interface to perform interactive resource management.

In one aspect, the synthesized dataset is broadcast to a location remote from the archeological resource location; the remote site device operates at least as a portion of a client and the server database operates at least as a portion of a server in a client-server software architecture; and the plurality of surveillance sensors comprise a spherical camera.

The phrase "augmented reality" means to superimpose computer-generated data, such as an image, sound, or other feature onto a user's view of the real world, thereby providing a composite, supplemented, or augmented view. For example, a web-based computer system may superimpose a 3D model of a measuring tool within a field of view of a camera system.

The word "app" or "application" means a software program that runs as or is hosted by a computer, typically on a portable computer, and includes a software program that accesses web-based tools, APIs and/or data.

The word "archaeology" means the scientific study of the material human past, through excavation, survey, and related research.

The phrase "business data" or "business content" means data associated with a landscape and/or site, e.g. geographical feature information such as ridge lines and water sources, adjacent sites or resources of interest such as adjacent historic or pre-historic sites, etc.

The phrase "cached data" means data, such as records, measurements, scripts, and media files, stored in a reserved memory location such that the data is readily available.

The phrase "client-server" or "client-server architecture" means a shared computer architecture in which the server hosts, delivers and manages the majority of the resources (e.g. computing resources) and services to be consumed by a client. There may be multiple clients connected to a single server over a network or internet connection.

The phrase "constructed environment" means a derived or constructed environment representative of a real environment, e.g., a digitally-created representation of a real environment.

The phrase "cloud computing" or the word "cloud" refers to computing services performed by shared pools of computer resources, often over the Internet.

The term "geodatabase" means a collection of geographic datasets of various types held in a common file system folder or common database.

The phrase "geographic information system" or "GIS" means a system which captures, stores, manipulates, analyzes, manages, and/or presents spatial or geographic data.

The phrase "user interface" or "UI", and the phrase "graphical user interface" or "GUI", means a computer-based display that allows interaction with a user with aid of images or graphics.

The phrase "hotspot" means an area or feature of interest, e.g., a geographical feature such as a ridge line, a manmade feature such as an arranged collection of stones, or buried features like walls, utility lines, etc.

The phrase "3D pose" means three-dimensional position and three-dimensional orientation.

The phrase "on site" or "onsite" means near or adjacent to a real environment investigation site.

The phrase "off site" or "offsite" means other than near or adjacent to a real environment investigation site.

The phrase "real environment" means an actual real-life environment, e.g., an outdoor landscape or site including nature features such as earth, water, sky, etc.

The phrases "resource landscape," "resource site" and "resource site location" mean a geospatially identifiable landscape or site location which possesses characteristics of interest, such as a physical resource such as a hydrocarbon, botanical or cultural resource.

The phrase "archaeological resource landscape" or "archaeological resource site" mean a geospatially identifiable landscape or site which possesses the physical (i.e. material) remains of human activity.

The phrase "virtual reality" means a computer-generated simulation or representation of a 3-dimensional image or environment that may be interacted with in a seemingly real or physical way by a user using specialized electronic equipment, such as a helmet with a screen inside or gloves fitted with sensors.

By way of providing additional background, context, and to further satisfy the written description requirements of 35 U.S.C. § 112, the following references are incorporated by reference in their entireties: U.S. Pat. No. 7,301,547 to Martins et al; U.S. Pat. No. 9,571,644 to Steiner; U.S. Pat. No. 9,652,896 to Jurgenson et al; U.S. Pat. No. 6,094,625 to Ralston; U.S. Pat. No. 8,773,465 to France; U.S. Pat. No. 9,196,094 to Ur; and U.S. Pat. No. 8,180,396 to Athsani et al; U.S. Pat. Appl. Publ. Nos. 2006/0152589 to Morrison et al; 2016/0337773 to Tsilfidis et al and 2015/0170256 to Pettyjohn et al; and non-patent literature documents "A Motion-Stabilized Outdoor Augmented Reality System" to Azuma et al; Proceedings of IEEE Virtual Reality '99 (Houston, Tex., 13-17 Mar. 1999), 252-259; and "Sensor Fusion for Augmented Reality" to Hol et al; Report no.: LiTH-ISY-R-2765, 9th International Conference on Information Fusion, Florence, 2006.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any storage and/or transmission medium that participate in providing instructions to a processor for execution. Such a computer-readable medium is commonly tangible, non-transitory, and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "module" as used herein refers to any known or later developed hardware, software, firmware, artificial intelligence, fuzzy logic, or combination of hardware and software that can perform the functionality associated with that element.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The disclosure will be readily understood by the following detailed description in conjunction with the accompanying drawings, wherein like reference numerals designate like elements. The elements of the drawings are not necessarily to scale relative to each other. Identical reference numerals have been used, where possible, to designate identical features that are common to the figures.

FIG. 6A shows a diagram of an embodiment of a data structure for authority agency forms and reports according to embodiments of the present disclosure;

FIG. 6B shows a diagram of an embodiment of a data structure for GIS feature recording according to embodiments of the present disclosure;

FIG. 6C shows a diagram of an embodiment of a data structure for Climate data according to embodiments of the present disclosure;

FIG. 6D shows a diagram of an embodiment of a data structure for historical data according to embodiments of the present disclosure;

FIG. 6E shows a diagram of an embodiment of a data structure for biological data according to embodiments of the present disclosure;

FIG. 6F shows a diagram of an embodiment of a data structure for geological data according to embodiments of the present disclosure;

FIG. 6G shows a diagram of an embodiment of a data structure for asset data according to embodiments of the present disclosure;

FIG. 6H shows a diagram of an embodiment of a data structure for media coverage according to embodiments of the present disclosure;

It should be understood that the proportions and dimensions (either relative or absolute) of the various features and elements (and collections and groupings thereof) and the boundaries, separations, and positional relationships presented there between, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments of systems for interactive site resource management, and methods of use of the systems, are described. Generally, the interactive landscape and site resource management systems surveys, collects and/or accesses local geospatially-referenced landscape and/or site survey data in the field and combines or synthesizes the survey data with other existing geospatially-referenced data, such as provided by external data sources (in one embodiment, provided by an external database) not located at the survey site. A user of the interactive site resource management system may interact with various and disparate datasets, such as the locally-obtained or locally-surveyed dataset or the externally-provided dataset, by way of an interactive remote site device. The interactive remote site device presents the various datasets, including any synthesized datasets, in any of several views or lenses, such as a temporal view, map view, augmented reality view, and virtual reality view. The interactive remote site device may be configured in any of several configurations, comprising a variety of sensors, peripherals, displays, and capabilities. The synthesized geospatially-referenced dataset may be used by any of several parties, to include authority agents, project leads, site developers, and maintenance personnel, for example. All or portions of the synthesized geospatially-referenced dataset may be recorded by a user, such as an on-site user, to create any of several specialized reports, such as a landscape or site report, an authorized development plan, a master landscape or site survey, and/or an as-built development plan. All or portions of the interactive site resource management system may be operated remotely.

Various embodiments of the system for interactive landscape and/or site resource management, also referenced as the "system", and various embodiments of methods of use of the system for interactive landscape and/or site resource management, also referenced as the "method", will now be described with respect to FIGS. 1-13.

The interactive landscape and site resource management system may operate in any of several environments. Generally, the term "landscape" refers to a large-scale environment, and the term "site" refers to a project area, such as a small-scale or locale environment with a defined project area.

Figure 1:
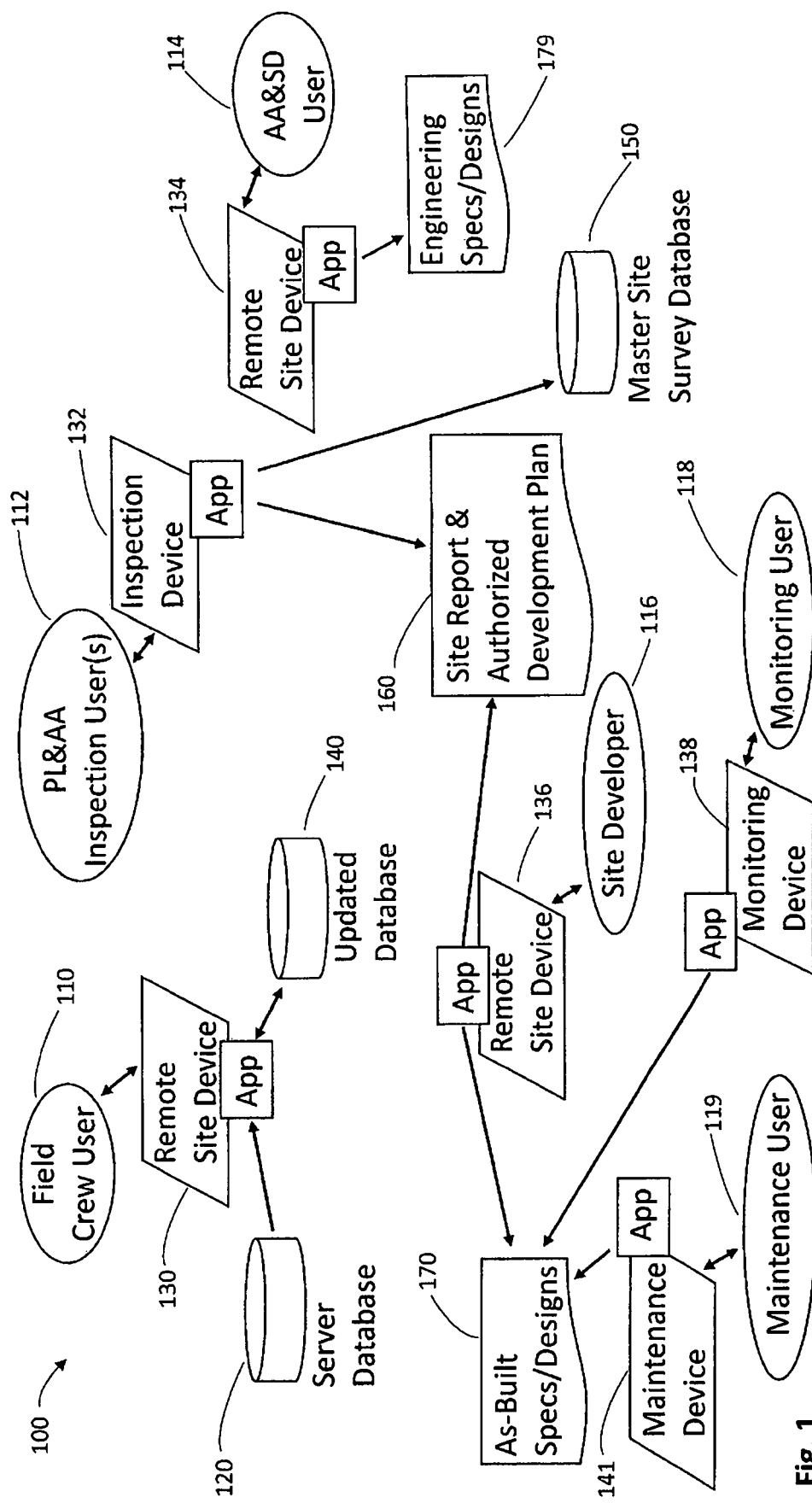
FIG. 1 shows an overview of a system for interactive resource management according to embodiments of the present disclosure.
Figure 2:
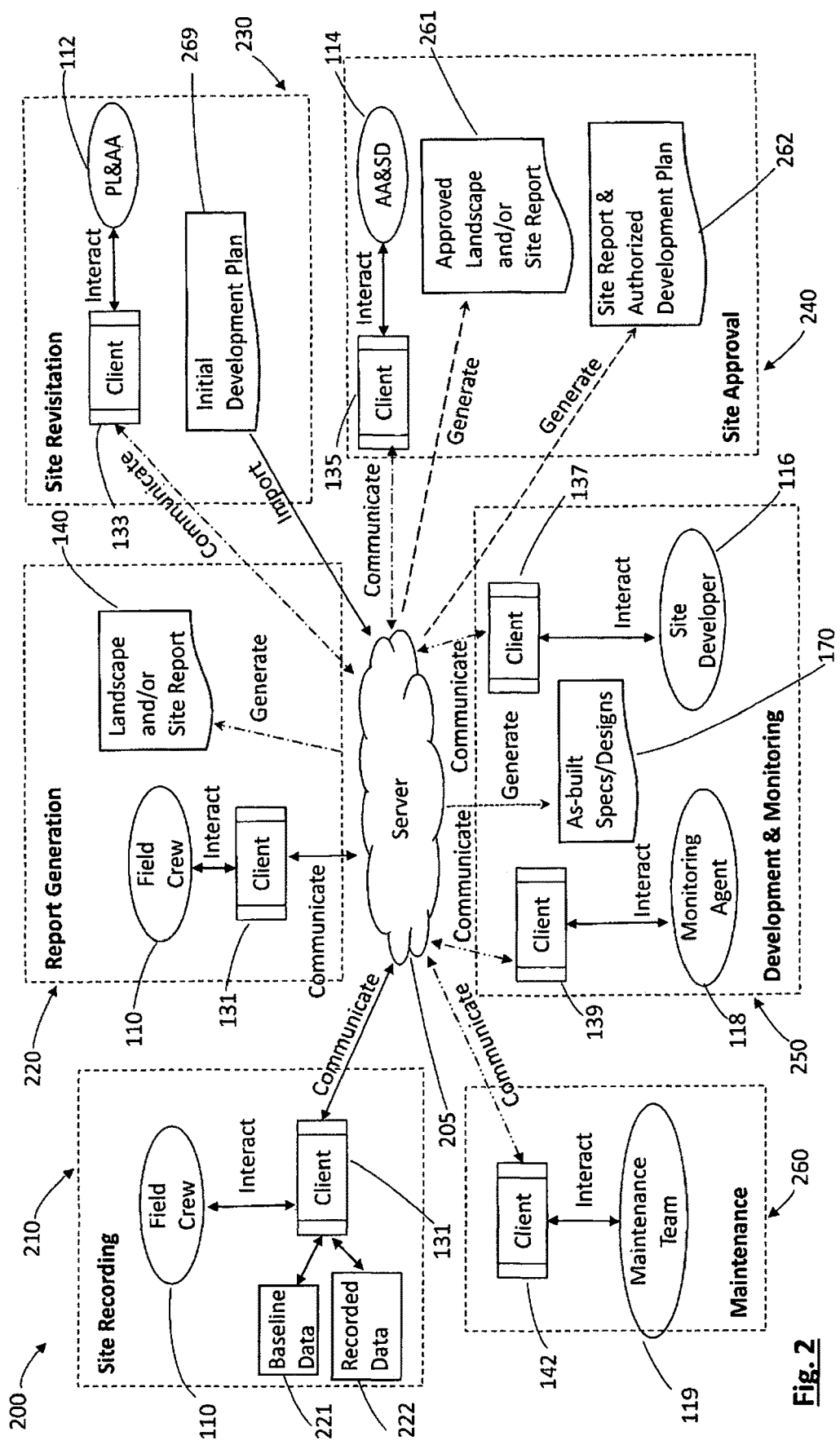
FIG. 2 shows an alternative overview of the system of FIG. 1 for interactive resource management, providing further details of hardware and software features, according to embodiments of the present disclosure.
Figure 3:
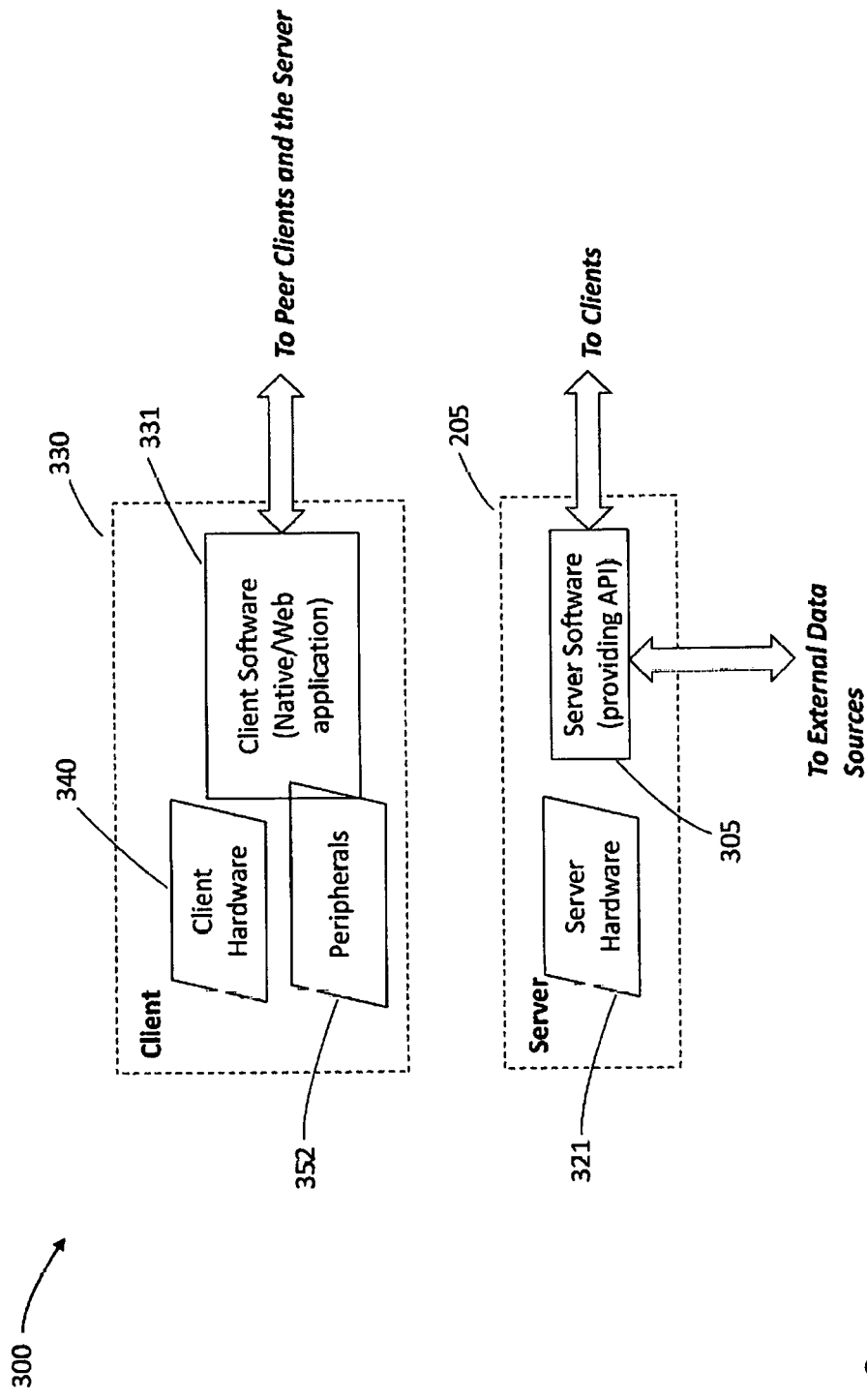
FIG. 3 shows further details of the client-server software architecture aspects of FIG. 2, according to embodiments of the present disclosure.
Figure 4:
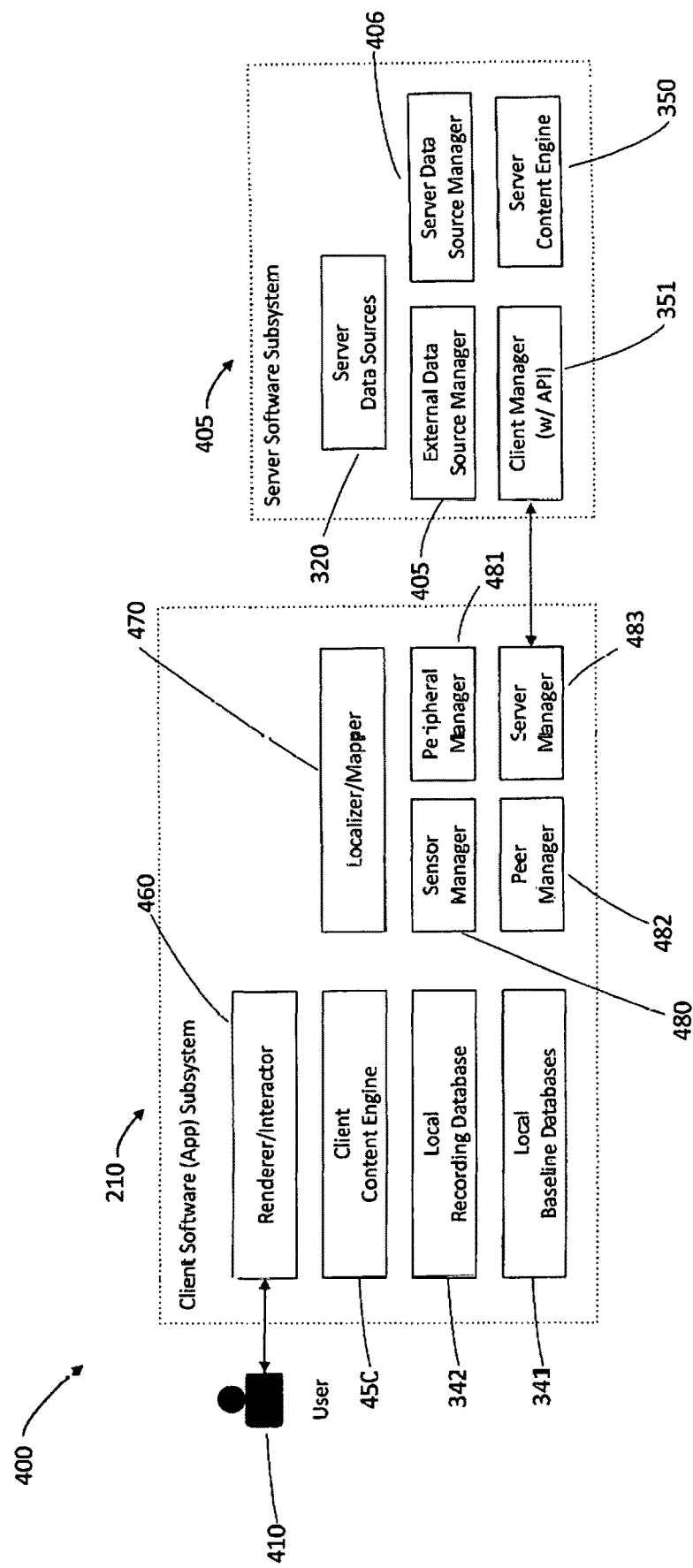
FIG. 4 shows an alternative overview of the system of FIG. 3 for interactive resource management, emphasizing software features, according to embodiments of the present disclosure.
Figure 5:
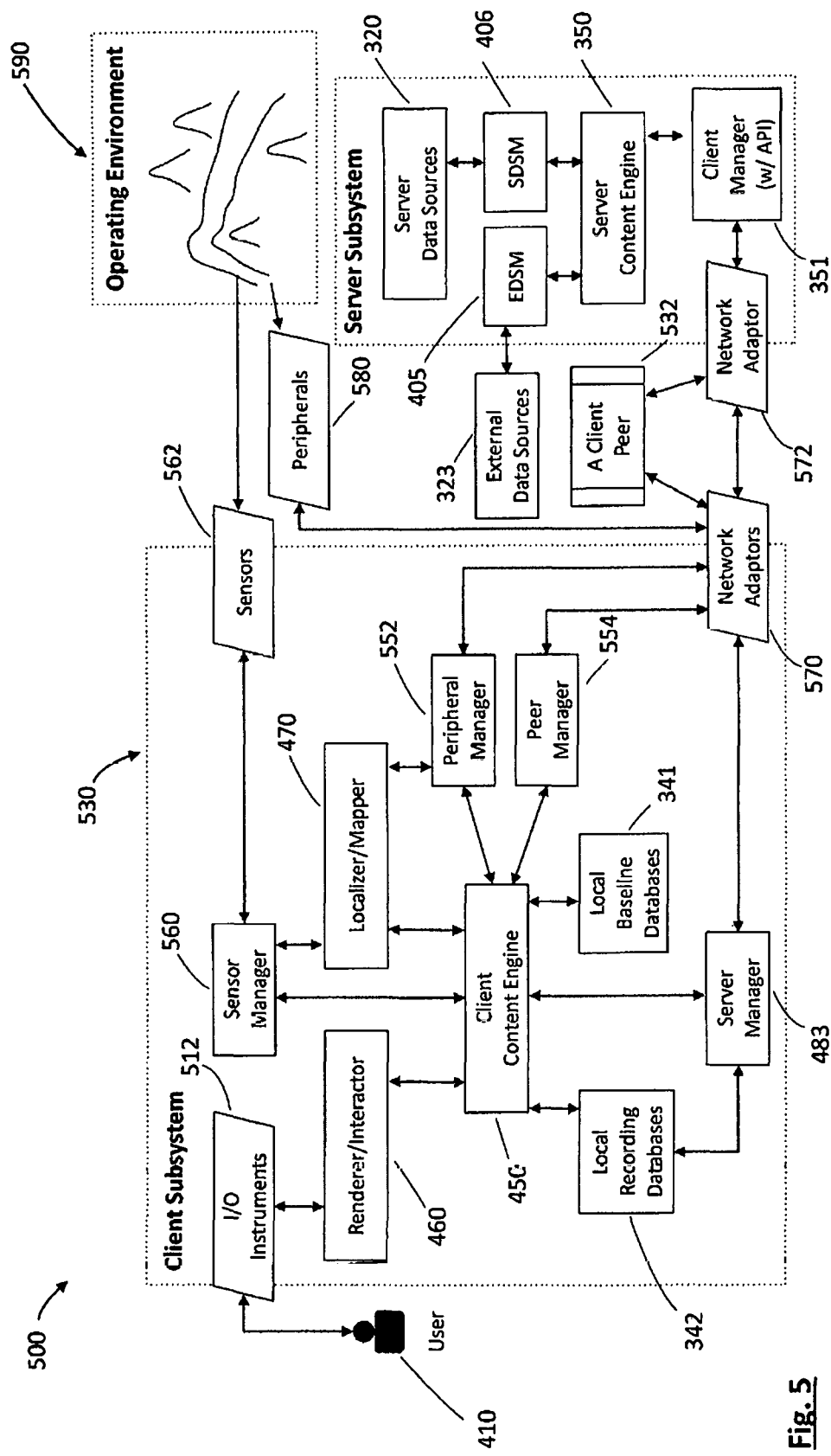
FIG. 5 shows an alternative overview of the system of FIG. 1 for interactive resource management, depicting interaction of the system with an operating environment.
Figure 10:
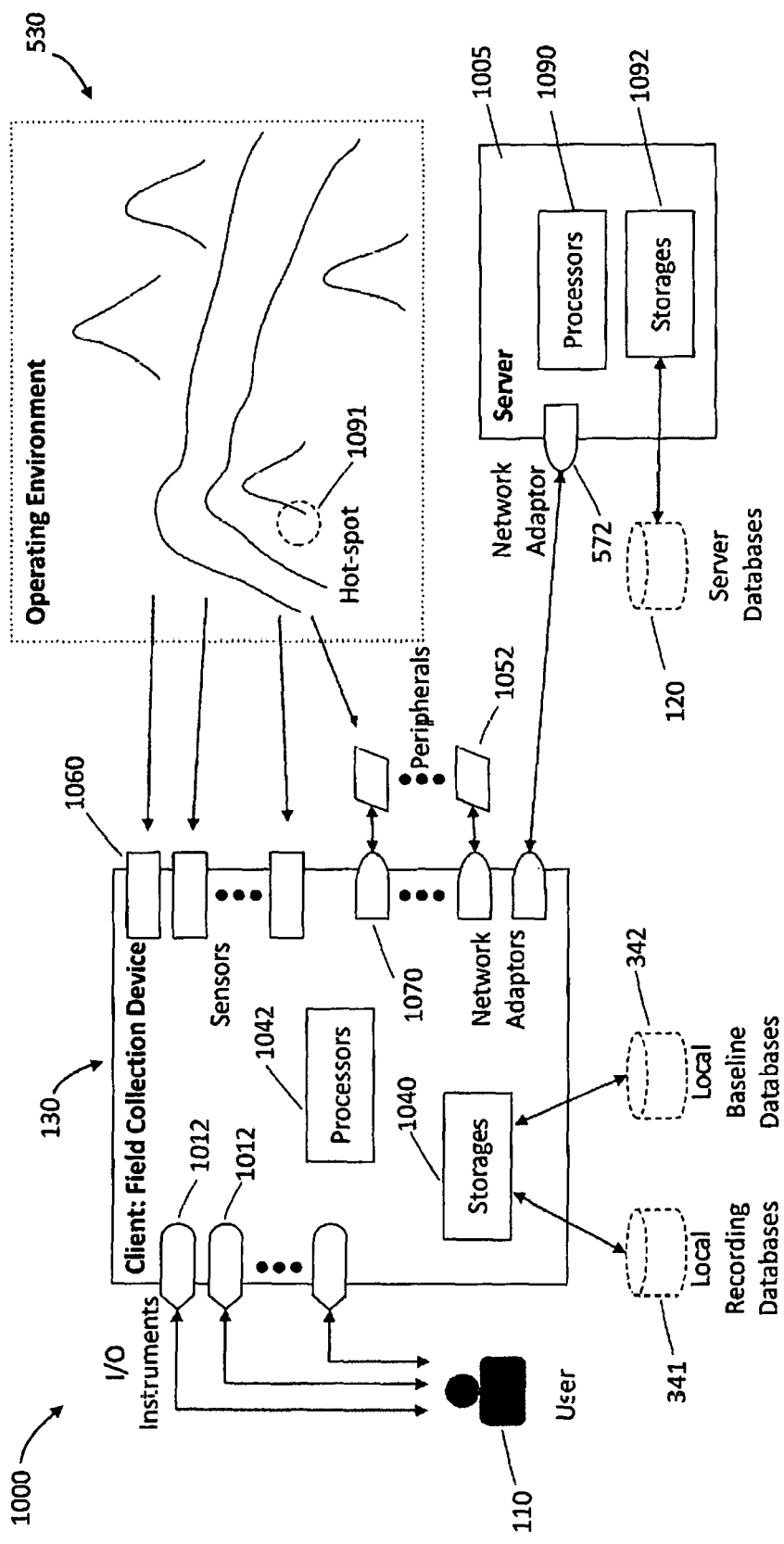
FIG. 10 shows an alternative overview of the system of FIG. 5 for interactive resource management emphasizing physical hardware and depicting interaction of the system about a hot-spot in an operating environment.

With particular attention to FIGS. 1-5 and 10, an interactive landscape and site resource management system 100, 200, 300, 400, 500, and 1000, respectively, is depicted. FIG. 1 emphasizes creation of and updating to various data sources (e.g. databases) of an interactive landscape and site resource management system 100. FIGS. 2-4 emphasize a client-server software architecture of a landscape and site resource management system 200, 300, and 400, respectively. FIGS. 5 and 10 emphasize a client-server software architecture of an interactive landscape and site resource management system 500 and 1000, respectively, interacting in an operating environment 590. More specifically, FIG. 5 depicts the flow of data between the hardware components for sensing, communication and user interaction, and the various software components of an operating client, and the hardware components for data storage and communication and the various software components of the Server.

Generally, the phrase "data sources" means a collection of accessible data that is accessed at a known location, to include physical locations such as a physical database and a virtual location, such as on a computing or storage cloud. Also, the term "database" is not limited to a physical database, and may, for example, define a broader data source as defined immediately above.

A field crew user 110 operates in an operating environment 590 and interacts with remote site device 130. From a hardware perspective, the remote site device 130 (aka field collection device) may comprise user input/output (I/O) instruments or devices 1012, such as a user interface (UI) or graphical user interface (GUI) components (see e.g. FIG. 10). For example, the I/O instruments may comprise a touch screen, microphone, haptic feedback, see-through (aka transparent) screen or display, non-see-through (aka opaque) screen or display, or any I/O device known to those skilled in the art.

In one embodiment, the remote site device 130 may be a tablet computer, smartphone, electronic wearables such as head-mounted displays, helmet-mounted displays, eyeglass displays, monocles, contact lenses, monoscopic, stereoscopic and/or telescopic lenses, and other portable electronic devices known to those skilled in the art. In one embodiment, the remote site device is not physically carried by a user 110, but instead is remotely operated, either by the on-site user 110 or by a user not at the survey site. For example, the remote site device may be an autonomous vehicle or semi-autonomous vehicle, such as a rover traversing the ground, an unmanned air vehicle (UAV) traversing the air, or an unmanned submersible vehicle traversing underwater.

The remote site device 130 may comprise one or more sensors 1060, such as a geolocation sensor that provides data associated with the remote device 130. The data provided by or output by the geolocation sensor may comprise location, orientation, user identification, and time stamp of the remote device 130. The one or more sensors 1060 may comprise active and passive sensors. For example, the sensors 1060 may include active sensors such as radars, LIDAR's, etc., which may sense or measure range and angle to a particular survey target. Stated another way, the sensor 1060 may output range and angle to a user-selected or otherwise identified survey target, such a hot-spot survey target 1091 of FIG. 10. The one or more sensors 1060 may comprise passive sensors, such as visible-band cameras, infrared cameras, spherical cameras, precision scanner to include a high-precision 3-D scanner, etc.

In one embodiment, the one or more sensors 1060 are configured as or form an internal part of the remote device 130 and as such may not function or be used independently, while the one or more peripherals 1070 may function or be used independently (is standalone) and thus extends the capability of the remote device 130. In one embodiment, one or more of the one or more sensors 1060 communicate with one or more of the one or more peripherals 1070.

The sensors 1060 may provide independent state data as to the sensor, e.g. a particular sensor may provide a measure of the sensor geolocation, orientation, and time of data measurement. In some embodiments, the one or more sensors 1060 are integrated to share data or align measurements. For example, the sensors 1060 may comprise a GPS sensor, an MMW radar, a lidar sensor, and a visible-band camera, wherein the GPS sensor provides orientation and time stamp data associated with MMW radar measurements, and the GPS sensor provides time stamp data associated with the visible-band camera. The one or more sensors 1060 may further comprise a compass, accelerometer, Gyroscope, Altimeter, and any survey sensor known to those skilled in the art.

The remote site device 130 may comprise peripherals 1052, such as any device or instrument to supplement the remote site device 130 in certain configurations or embodiments, such as a portable thumb drive, external battery, etc. For example, an embodiment of a system 100 comprising a remote site device 130 configured as a tablet portable computer may comprise a peripheral 1052 comprising an autonomous vehicle or semi-autonomous vehicle, such as a rover traversing the ground, an unmanned air vehicle (UAV) traversing the air, or an unmanned submersible vehicle traversing underwater.

The remote site device 130 may comprise one or more processors 1042, and one or more storage elements 140. The storage element 1040 may comprise a local recording database 341, which may record or store, for example, measurements or outputs from the one or more sensors 1060. The storage element 1040 may comprise a local baseline database 341 which may record or store, for example, geospatially-referenced data regarding the survey landscape and/or site to include anticipated hot-spots 1091.

The remote site device 130 may comprise one or more network adaptors 1070 which may provide a communication to another device or system component. For example, in the client-server configuration of FIG. 3, one or more network adaptors 1070 of the remote site device 130 provides a communication to the server 1005 portion of the system 1000 by way of the server network adaptor 572. The server 1005 portion of the system 1000 comprises one or more processors 1090 and one or more storage elements 1092. The one or more storage elements 1092 may comprise a server database 120.

The remote site device 130 may comprise an app that provides a set of functionalities of the system 100. The app may be any of a native app running or hosted on the remote device 130, a web-based app, or any app configuration known to those skilled in the art.

As briefly discussed above, the interactive landscape and site resource management system may be configured in a client-server architecture, as depicted in FIGS. 2-5.

A client 330 may interact with a server 205. The client 330 may comprise an app 331, client hardware 340 (as described above with respect to FIG. 10, e.g. the hardware associated with the remote site device 130), a local baseline database 341, a local recording database 342, and peripherals 352. The app 331 may be configured to comprise several components, as shown in FIG. 4 and described in more detail below. The app 331 manages interaction with one or more data sources, such as client databases which may include local baseline databases 341 and local recording databases 342.

Note that the words "interact", "communicate", "connect" and the like, when involving computer hardware and/or computer software elements, mean electronic communication or electronic transfer to include by wireless means, such as the transfer of data.

A server 205 may comprise one or more server data sources 320 (in one embodiment, the data sources comprise one or more databases), server hardware 321, a client manager 351, an external data source manager (EDSM) 405, and server data source manager (SDSM) 406. In one embodiment, the data sources 320 may comprise cloud-based data sources. The client manager 351 interacts or communicates with one or more clients 351 and may comprise one or more Application Programming Interfaces (APIs). The server 205 may further comprise a content engine 350, the content engine 350 connected with the client manager 351, SDSM 406, and EDSM 405 which further communicates with one or more external data sources 323.

The one or more server data sources 320 perform any of several functions. As a baseline, the server data sources 320 perform or provide database management functionalities such as data concurrency, data security, data integrity, and uniform administration procedures. In addition, the one or more server data sources 320 also allow selectable exporting of authorized data resources as local copies on one or more remote site devices. The selectable exporting of authorized data resources as local copies allows offline use, access, and/or leveraging of the data. Furthermore, the one or more server data sources 320 allows synchronization of data across the one or more clients and the server. The one or more server data sources 320 also store and maintain the synchronized dataset, as created by one or both of the server content engine 350 and the client content engine 450.

The server 205 client manager 351 provides control, communication, and management of the one or more clients served by the server 205. The client manager 351 may also communicate, control and manage other external third-party apps or platforms. For example, the client manager 351 may communicate with a specialist vendor only sporadically involved in an activity at a resource landscape and/or site, such as a university researcher or a vendor operating a specialized piece of sensor equipment such as a ground-penetrating radar. The client manager 351 would allow and enable temporary interaction with such a third party. The client manager 351 may comprise one or more APIs to communicate with the one or more clients and third-party apps/platforms.

The client manager 351 may also provide server access control, such as providing the authentication services and/or authorization services. (See FIGS. 9A-B for more description of server authentication and server authorization details). In one embodiment, the client manager 351 provides the server content engine 350 with consultation services of identification authentication and user authorization by verifying user credentials.

The server content engine 350 accesses data from multiple sources, such as server data sources 320 and external data sources 323, and synthesizes, merges or combines these data. The server content engine 350 may also access and utilize data from one or more clients 330, such as data from one or both of the local baseline databases 341 and local recording databases 342, as provided to the server content engine 350 by way of the client manager 351. For example, a particular hotspot 590 of interest in an operating environment 590 may be identified in an external database to possess or reside at a nominal location (a nominal latitude/longitude and MSL vertical location, aka lat/long/elevation location). A field crew user 110, by way of the remote site device 130 and one or more sensors 1060, may measure the same particular hotspot 590 to have a slightly different field-measured location. The server content engine 350 is configured to accept both measurements of the location of the same particular hotspot 590 and output a merged or synthesized value for the location of the particular hotspot 590. The server content engine 590 may use any of several known techniques for such state estimation determinations, such as Kalman filtering and any state estimation techniques known to those skilled in the art. In some embodiments, all or some of the merging or blending or synthesizing of data is performed by a client content engine 450 (see FIG. 4).

The data provided to or accessed by the server content engine 350 is varied in character. Data that traditionally is internally controlled or internally sourced typically exists in different silos and may reside in various media formats and file formats, may contain different labels for the same information, and may contain similar information but worded in different ways. In contrast, data that is not internally controlled or internally sourced, aka external data, may be even less consistent and may contain additional fields or tables or have missing fields or tables, may contain differently named fields, may reuse a name (e.g., table name or field name) in a different way, may contain the same named fields with different constraints, and may contain the same named fields with different data types. Further details regarding data management, data processing, and the like are provided immediately below and in FIG. 9.

The server content engine 350 handles the above data character challenges in the following manner. First, the data are sourced. In this step, data from multiple silos or repositories that have been manually or automatically assigned to or present relevant data for a project are identified. To manage or keep track of the sourced data and maintain the mapping between the sourced data and the internal Server data that is known to the Server Content Engine, strategies such as data repository location, authentication "tokens", proxies, and data type cast may be used. Next, the sourced data are filtered based on the user's profile and preference. The sourced and filtered data are then synthesized (or, stated another way, the data are rearranged and linked) and prepared for use by the app. Data preparation for the app may be performed manually, automatically, or semi-automatically. The data collected from the app may be analyzed and synthesized manually, automatically, or semi-automatically based on the requirements of particular data consumers. In one embodiment, the data collected from the app may be integrated with any of several third-party apps, such as a report authoring online service that provides a web interface for users to collaborate on finalizing the collected data synthesized by the server content engine.

In various embodiments, the interactive landscape and site resource management system may be configured in a client-server architecture that serves a plurality of clients, as depicted in FIGS. 1-2.

With particular attention to FIG. 2, an interactive landscape and site resource management system 200 is depicted in a client-server architecture in which seven clients are interacting with server 205. Stated another way, the server 205 is serving seven clients and thus, for example, sharing computational demands and exchanging data with one or more of the seven clients. Each of the seven clients of FIG. 2 are associated with a particular type of user performing particular tasks and with particular hardware and software configurations of app and remote site device.

Generally, a set of six activities performed in relation to a resource site are depicted in FIG. 2. (The activities and associated purpose are further described with respect to FIGS. 11-13 below.) Note that while a set of six activities are depicted in FIG. 2, fewer or additional activities may be provided in other embodiments. Note that each of the several clients depicted in FIG. 2 may provide data to the interactive landscape and site resource system 200 which results in updating, by way of the content engine 350, to a database of data describing the resource landscape and/or site. Also, the sequence of elements and associated activities are also described as methods of use of the interactive site resource system 200 in FIGS. 11-13.

In the interactive landscape and site resource system 200 of FIG. 2, an initial site recording is performed as site recording element 210. One or more field crew member users 110 would operate one or more remote site devices 130, the remote site devices 130 comprising or running an app as a field crew client 131. The field crew client 131 accesses baseline data 221 and recorded data 222. The baseline data 221 may reside on a local baseline database 341 and may comprise geospatially-referenced data, landscape and/or site historical data, and the like. For example, the local baseline data 221 may comprise local site climate data, such as depicted in FIG. 6C and historical data such as depicted in FIG. 6D. More description of data records and data types are provided below with respect to FIGS. 6A-I. The field crew client 131 records recorded data 222 as observed in the field, such as by way of sensors 1060. The recorded data 222 may be recorded on a local recording database 342.

The one or more field crew member users 110 would operate one or more remote site devices 130 to generate one or more site reports 160, as depicted as report generation element 220. The site report 160 may be of any of several embodiments or formats, such as a field report of identified resource features. For example, an authority agency form (e.g. for Bureau of Land Management) may be populated as enabled by field observations and field data collections, such as depicted in FIG. 6A.

Another client, a site revisitation client 133, may be served by the server 205 in the site revisitation element 230 of FIG. 2. The site revisitation client 133 is engaged by a project lead and/or authority agent (PL&AA) user. The PL&AA may serve to provide a quality check on the work of the field crew 110 team, for example, or provide a complementary or supplementary observation perspective to the resource landscape and/or site. For example, the PL&AA user may have a specific expertise or a specific charter or mandate that focuses on other aspects of the landscape and/or site, thereby collecting different data. Although not explicitly shown in FIG. 2, the data or observations made by the PL&AA user, by way of client 133, may be loaded as recorded data 22 and stored on local baseline databases 341 and/or other databases on the interactive site resource system 200.

A site approval client 135 may also be served by the server 205 in the site approval element 240 of FIG. 2. The site approval client 135 is engaged by an authority agent and/or site developer (AA&SD) user 114. The AA&SD user 114 may provide a formal review and approval of one or more of the landscape or site reports 160 created at report generation element 220 as revisited at the site revisitation element 230. In one embodiment, the AA&SD user is instead at least two users, one an authority agent (e.g. representing a controlling government body, such as Department of the Interior) and the other a developer (e.g. a party seeking to extract hydrocarbon resources such as oil and natural gas within the area under review by the interactive landscape and site resource system 200.) The site approval element 240 produces an approved landscape and/or site report 261 and an authorized development plan 262. Note that the AA&SD client 135 is specialized to enable and facilitate the production of the approved landscape and/or site report 261 and/or the authorized development plan 262. Stated another way, the AA&SD client 135 with associated app and remote site device, presents unique displays and functionalities that allow the AA&SD user to create the approved landscape and/or site report 261 and/or the authorized development plan 262.

A pair of additional clients are engaged and serviced by the server 205 at development and monitoring element 250. A developer user 116 engages a developer client 137 to perform developer functions, such as plan for and execute development plans. A monitoring agent user 118 engages a monitoring agent client 139 to perform, for example, an oversight role to ensure the developer and others are executing developer plans per the approved landscape and/or site report 261 and/or per the authorized development plan 262. As the resource landscape and/or site is developed, an as-built specifications/designs document 170 is produced. The as-built specifications/designs document 170 describes the actual characteristics of the development site, meaning the manner in which the site was truly built. The as-built specifications/designs document 170 will document any deviations from the authorized development plan 262.

The interactive landscape and site resource system 200 also comprises a maintenance team user 119 engaged with a maintenance team client 142. Again, similar to all of the plurality of clients depicted in FIG. 2 and served by the server 205, the maintenance team client 142, with app and remote site device, is tuned or specialized to the requirements of the particular user. Here, the maintenance team client 142 is specialized to the requirements of the maintenance team user 119. For example, the maintenance team client 142 may provide a display that presents selectable measures of particularly sensitive areas of the developed resource landscape and/or site, such as drainage areas, species habitats, archaeological sites, etc.

FIG. 1 provides a complementary view to that of FIG. 2 with regards to the interaction of multiple users with an interactive landscape and site resource management system. In particular, the interaction with and/or modification of one or more databases is depicted. The interactive landscape and site resource management system 100 of FIG. 1 includes multiple users, each of which may engage a client as served by a server in a client-server architecture as described with respect to FIG. 2. In some embodiments, the databases depicted of FIG. 1 may be combined and may physically reside at the survey site, in connection with or coupled to one or more remote site devices.

A field crew user 110 interacts with a remote site device 130 to perform interactive resource management of a resource landscape and/or site. The resource landscape and/or site may be termed a remote landscape or site, in that it is physically located away from fixed infrastructure. In one non-limiting embodiment, the resource site is an archaeological site. The field crew user 110 may load or access a data storage 1040 located-near, adjacent, or coupled to the remote site device 130. The user 120 may load or access data residing on a server database 120, the server database located remote from the resource site, such as at a site of fixed computer et al infrastructure or in a network cloud (see, e.g. element 205 of FIG. 2).

The server database 120 may comprise a baseline dataset, the baseline dataset comprising baseline geospatially-referenced data.

The field crew user 110 operates the remote site device 130 to survey the resource site. Stated another way the field crew user 110 operates the remote site device 130 to obtain measurements with respect to the operating environment 590. The user 130 may direct one or more sensors 1060 toward specific survey targets, such as one or more hotspots 1091. The measurements employ one or more sensors 1060 as described above. In one embodiment, the user simply activates and/or orients the remote site device 130, wherein the remote site device 130 automatically or semi-automatically records or collects data regarding the operating environment 590 of the remote site. For example, the remote site device 130 may automatically scan the operating environment 590 with a radar sensor to create geospatially-referenced data. The measurements collected by the one or more sensors 1060 are used to create an updated database 140.

The updated database 140 is a database that stores baseline dataset from the server database 120 as updated by data obtained from the one or more sensors 1060. The updating process is performed by one or both of the server content engine 350 (see e.g. FIG. 3) and the client content engine 450 (see e.g. FIG. 4), as described below in more detail.

The updated database 140 may be accessed by any of several additional users of the system 100. For example, a remote user, such as supervisor of the field crew user 110, may access the updated database 140. Such access may enable, for example, the supervisor to review the data for any database anomalies (e.g. erroneous sensor data that caused an erroneous database update) or survey anomalies that might indicate a newly-discovered hotspot 1091. The updated database 140 may also be accessed by, for example, a project lead and/or authority agent (PL&AA). The PL&AA may provide an inspection role. For example, the PL&AA may inspect the data of the updated database for quality control. The PL&AA user 112 may engage with a remote device configured in a unique manner or of a different embodiment than the remote site device 130 of the field crew user 130. Stated another way, the PL&AA user 112 may operate or interact with an inspection device 132, the inspection device 132 configured with elements and/or functions similar to those of the remote site device 130.

Another physical remote site device 134, or another configuration of the remote site device 130, is engaged by an authority agent and/or site developer (AA&SD) user 114. As discussed above with respect to FIG. 2, the AA&SD user 114 may provide a formal review and approval of one or more of the landscape and site reports 160 created by the field crew user 110. The AA&SD user 114 may engage with engineering specifications/designs 179 as provided, for example, by the developer. As depicted in FIG. 1, the AA&SD user 1124 may interact with the PL&AA user 112, either physically or virtually via respective remote site devices 134 and inspection devices 132.

A master landscape and site survey database 150 is created based on inputs from one or more the above users, e.g. the field crew user 110, PL&AA user 112, and the AA&SD user 114. The master landscape and site survey database 150 may store, among other data items, the landscape and/or site report(s) and authorized development plan 160 data items. The landscape and/or site report(s) and authorized development plan 160 data items are accessed and used by the developer 116 via a developer remote site device 136 as described above with respect to FIG. 2. The developer 136 may interact with field crew user 110 for clarification on any aspects of the authorized development plan (e.g. boundaries of a field crew user's description of a culturally-sensitive portion of the resource site). Although not shown explicitly in FIG. 1, the developer user 116 may also interact with other users beyond the field crew user 110, such as, for example, the PL&AA to suggest a proposed change or deviation from the authorized development plan. Note that such interactions are greatly facilitated by the interactive landscape and site resource management system 100 through the sharing of the same data by way of the master landscape site survey database 150 and through use of a remote site device that operates through a common server 205. In such a scheme, a readily-available, and current shared description of the resource landscape and site may be accessed by all users (by way of a shared database), and the data may be presented and analyzed in a manner specific to the particular user (by way of a client-tunable remote site device or client and associated app).

FIG. 1 also depicts a monitoring user 118 engaged with a monitoring device with associated app, and a maintenance user 119 engaged with a maintenance device 141. Each of these users may operate monitoring devices that are configured to operate as clients of a server 205 in a client-server architecture, as described above with respect to FIG. 2.

FIGS. 4 and 5 depict further details of an interactive resource management system 400, 500, respectively, in a client-server architecture arrangement.

With attention to FIG. 4, a client 430 element or component is depicted engaged with a server 405 element or component. Each of the client 430 and the server 405 may be considered a subsystem of the interactive resource management system 400. The client 430 interacts or communicates with the server 405 by way of server manager 483, a component of the client 430, and the client manager 351, a component of the server 405. Stated another way, the server manager 483 of the client 430 interacts with the client manager 351 of the server 405.

In addition to the client manager 351, the server 405 further comprises one or more server data sources 320 and a server content engine 350, as described above.

The client 430 comprises a renderer or renderer/interactor 460, which is configured to render or display a plurality of views or perspectives of the data stored in any of the databases of the interactive resource management system 400, such as data stored in the updated database 140 described above, and to enable interaction with a user 410.

The renderer/interactor 460 draws from data synthesized by the client content engine (in some embodiments, synthesized instead by or with aid of the server content engine), the local data that undergoes synthesis generated or managed by the localizer/mapper 470. Stated another way, the renderer/interactor 460 is enabled by synthesized data stored in one or both of the local recording database 342 and the local baseline database 341, that synthesized data including data locally obtained by way of the localizer/mapper 470 and synthesized by way of the client content engine 450 and/or server content engine 350.

The localizer/mapper 470 of the client 430 generally creates a local representation of a resource landscape and/or site(s) through use of one or more techniques of ground mapping, collaborative ground mapping, and ground-aerial joint mapping. The localizer/mapper 470 enables specialized user views of a resource landscape and/or site to be presented by the render/interactor 460, such as augmented reality views.

Generally, the localizer/mapper 470 constructs a geospatially-referenced map of the resource environment of interest using computer vision mapping algorithms, ranging from simple 2D topological maps to complicated 3D surface models. (The geospatially-referenced map may also be referred to as a computer vision map). A local geospatially-referenced map may be required when, for example, the precisions of positioning values from various state sensors (e.g. GNSS receivers) are inadequate to drive specialized user views of a resource landscape and/or site to be presented by the render/interactor 460, such as augmented reality views. In one embodiment, the geospatially-referenced map may be fully or partially generated a priori, meaning prior to user arrival at a resource landscape or site. In one embodiment the localizer/mapper 470 operates autonomously (without user or human interaction) or semi-autonomously. In one embodiment, the localizer/mapper 470 operates in a background processing or background acquisition mode in that the localizer/mapper 470 is gathering sensed data and constructing a local geospatially-referenced map while the user team is traveling to the resource site(s).

As briefly provided, the localizer/mapper 470 of the client 430 creates a local representation of a resource landscape and/or site through use of one or more techniques of ground mapping, collaborative ground mapping, and ground-aerial joint mapping. In ground mapping, a local representation of a resource landscape and/or site is created in the background while users are involved in other tasks. The ground mapping may occur by a camera localization, mapping and sensor fusion technique. Here, 2D camera and other relevant location/direction/motion sensors of a remote site device operate in the background to gather sensor measurements. The ground mapping may also occur by spherical camera localization and mapping. Here, a streamed spherical panorama video from the spherical camera peripheral device builds the computer vision map and localizes within.

In one embodiment of the localizer/mapper 470 creating a local representation of a resource site through ground mapping, a spherical camera and a tablet computer are utilized. In this embodiment, dubbed spherical camera rectification linking, the tablet computer is used as a field collection device. The tablet computer is held by the user and displays a localizable visual fiducial marker as the screensaver when the screen is idle. Then, each panorama video frame that includes the visual fiducial marker may be used to solve for the transformation of the spherical camera with regard to the world when the panorama is taken. This transformation in turn can be used to rectify the panorama, regardless how tilted the Spherical Camera is held when the original panorama frame is shot. In the embodiments with an electronic wearable as the field collection device, the transformation from the marker to the world computed from the externally displayed marker may be fused with that via the wearable.

Note that in embodiments in which an autonomous vehicle, such as a ground robot, is used as the field collection device, it is straightforward to obtain the transformation of the spherical camera with regard to the world, since the spherical camera is typically rigidly affixed to the robot body.

The localizer/mapper 470 may also create a local representation of a resource landscape and/or site through collaborative ground mapping. In collaborative ground mapping, a local representation of a resource landscape and/or site is generated by real-time merging of multiple computer vision maps covering separate areas by different ground mapping agents.

The localizer/mapper 470 may also create a local representation of a resource landscape and/or site through ground-aerial joint mapping. In ground-aerial joint mapping, a local representation of a resource landscape and/or site is generated by real-time merging of different modalities of sensor outputs and computer vision maps by ground mapping agents and drones.

The local content engine 450, either independent of the server content engine or in cooperation with the server content engine, provides synthesized sourced data with data collected by the user and peers. The resulting synthesized data are then available to enable rendering and interacting by the render/interactor 460. Note that any data collected by any peers may be received in real time through the peer manager 482 if the offline peer connections exist.

The data created by the local content engine 450 is stored on one or both of the local recording database 342 and the local baseline database 341. In one embodiment, the local baseline database 341 is a local database that contains data which is read-only by the user but is still synchronizable with the server only by pulling down the server-side updates. In one embodiment, the local recording database 342 is a local database that contains data that is editable by the user and is also synchronizable with the server. The local recording database 342 may be used to store the user collected data.

In one embodiment, access to one or both of the local recording database 342 and the local baseline database 341 are controlled by a local access control element. The local access control element may locally perform identification authentication and user authorization by verifying user credentials for accessing local resources. In this embodiment, the access control is a simpler process than the access control on the server (as described above and in FIGS. 7-8), in that here, only a comparison of claimed credentials with locally stored credentials is performed, the locally stored credentials having already been verified through the server access control.

The render/interactor 430 provides both rendering of visual displays of synthesized data to a user and the ability for a user to interact with the synthesized data. The render/interactor 430 is driven by data residing in the local content engine 342 and is the principal interface between the user and the overall interactive resource management system. Stated another way, the render/interactor 430 provides the principal user interface (UI) and user experience (UX) for a user of the interactive resource management system in various embodiments.

The render/interactor 430 may operate in an offsite mode and an onsite mode, dubbed situation modes. In onsite mode, the render/interactor 430 may provide an augmented reality experience to a user when the user interacts with the data, the data residing on one or both of the local recording database 342 and the local baseline database 341. In offsite mode, the render/interactor 430 may provide a virtual reality experience to a user when the user interacts with the data, the data residing on at least one of the local recording databases 342, the local baseline database 341, and the server data sources 320.

The render/interactor 430 may render or present or display any of several views to a user. Stated another way, the render/interactor 430 is configured to present a plurality of views of the views provided above, the synthesized dataset may be created from datasets existing in local datasets on local databases (e.g. the local recording database 342 and local baseline databases 341), the server data sources 320, and any external databases 323. The render/interactor 430 may present any of user-selectable views, which may be presented as full display views, partial display views, or a widget floating on top of a full or partial screen view. The render/interactor 430 may present views that include first person view, map view, perspective view, and temporal view.

In the first-person view provided by the render/interactor 430, a scene of the resource landscape and/or site may be used as the background with data overlaid on top and, accordingly, viewed from the user's own viewpoint. In one embodiment wherein the client utilizes a non-see-through screen (aka an opaque screen), the live feed from the forward facing camera is displayed on the remote site device (e.g. on a tablet computer screen) as the background. In another embodiment, with the client utilizing a non-see-through screen, the 3D surface model is displayed on the remote device's screen viewed from the user's viewpoint. In embodiments with the client utilizing a see-through screen (aka a transparent screen), the user sees the actual light reflected by the real world through the screen, and simultaneously the screen renders and aligns the corresponding data on the actual real world, as viewed by the user. Embodiments that employ transparent screens may still be used as in the aforementioned embodiments that employ opaque screens by displaying the live feed from the camera or the 3D surface model from the user's viewpoint full screen, which blocks the light reflected by the real world from passing through any location on the screen.

In the map view provided by the render/interactor 430, a traditional 2D map is displayed with data overlaid on top of it accordingly.

In the perspective view provided by the render/interactor 430, a 3D surface model is used as the background with data overlaid on top of it accordingly and an avatar of the user may be placed on the surface, accordingly, viewed by a virtual tracking camera just behind, slightly above, and slightly facing down towards the user avatar. In another embodiment of the perspective view, the views show a live feed from an airborne or ground traversing drone camera.

In the temporal view provided by the render/interactor 430, any of the above views are shown unfolding with time, the time steps selectable by the user.

In one embodiment, the renderer/interactor 460 comprises a voice assistant. The voice assistant enables tasks such as voice dictation and voice command. With the capability of Natural Language Processing, recorded contents from voice dictation may be automatically labeled and stored in the corresponding fields.

The client 430 of FIG. 4 may further comprise several software management modules, the software management modules generally communicating and controlling between elements of the interactive resource management system 400. More specifically, the sensor manager 480 manages communications and controls back and forth between the one or more sensors 562, and the peripheral manager 481 manages communications and controls back and forth between the one or more peripherals 1052. The peer manager 482 manages communications and controls to external peers, and the server manager 483 communicates with the client manager 351 of the server.

As described above with respect to FIGS. 1 and 2, the app associated with the remote site device may be tuned for the user. More specifically, the app may be tuned in functionalities, displays, access to databases and/or data, etc. Stated another way, the app may be selectively set in any of several app modes. For example, a user may select or choose application modes or settings based on the app scenario or the user task or focus, wherein the app obtains the required data to enable the display or user task. The required data is passed to the render/interactor for user presentation and interaction. The app settings or modes may include field guidance, data collection, resource evaluation, report authoring, field monitoring, on-going maintenance, and job training.

When the app is configured for field guidance, synthesized data (from one or more of the databases identified above) is prepared for use by the Client Content Engine 450. The field guidance mode may use sourced data, authored data, and data from sensors and peripherals.

When the app is configured for data collection, the app may use sourced data, collected data, authored data, and data from sensors and peripherals, and may include metadata automatically retrieved and associated data from sensors, peripherals, and existing data, according to the data recordation requirements.

When the app is configured for resource evaluation, the app may use sourced data, collected data, and the data from sensors and peripherals. When the app is configured for report authoring, the app may use sourced data and collected data. When the app is configured for field monitoring, the app may use sourced data, authored data, and data from sensors and peripherals. When the app is configured for ongoing maintenance, the app may use sourced data, authored data, and data from sensors and peripherals. Also, when the app is configured for job training, the app may use sourced data, authored data, and data from sensors and peripherals. Lastly, when the app is configured to evaluate and interpret changes to resources over time, e.g. those impacted by natural or human-made causes, the app may also use sourced data, authored data, and data from sensors and peripherals.

FIGS. 6A-I depicts a series of data structures that may be used by elements of an interactive resource management system, according to the embodiments of the disclosure. The data structures may be combined, and data elements of any data structure may be added, rearranged, or deleted.

FIG. 6A shows a diagram of an embodiment of a data structure 600 for authority agency forms and reports. More specifically, the example depicts a data structure describing a Management Data Form from the Colorado Office of Archaeology and Historic Preservation. The data structure has a temporal attribute provided as element 601. The data structure 600 comprises five columns of data, describing resource name 602, project name 603, site categories 604, boundary description 605, and site dimensions 606. The data structure 600 may form a part of the approved site report 261 described in FIG. 2.

FIG. 6B shows a diagram of an embodiment of a data structure 610 for GIS (Geographic Information System) feature recording. More specifically, the example depicts a data structure describing an artifact point in an archaeological GIS recording. The data structure has a temporal attribute provided as element 611. The data structure 610 comprises eight columns of data, describing component 612, type 613, site 614, feature type 615, lat/long 616, altitude 617, attachments 618, and notes 619. The data structure 610 may form a part of the field crew site report 160 described in FIG. 2.

FIG. 6C shows a diagram of an embodiment of a data structure 620 for Climate data. More specifically, the example depicts a data structure describing annual averages of rainfall. The data structure has a temporal attribute provided as element 621. The data structure 620 comprises six columns of data, describing city 622, rain 623, snow 624, sunny days 625, summer high 626, and winter low 627. The data structure 620 may form a part of the baseline data 221 described in FIG. 2.

FIG. 6D shows a diagram of an embodiment of a data structure 630 for historical data (Ute tribes, homesteading, historical events, etc.). More specifically, the example depicts a data structure describing an excavation. The data structure 630 comprises five columns of data, describing site 632, period 633, archaeologist 634, organization 635, and notes 636. The data structure 630 may form a part of the baseline data 221 described in FIG. 2, and further serve as data for monitoring by the monitoring agent 118 discussed with respect to FIG. 2.

FIG. 6E shows a diagram of an embodiment of a data structure 640 for biological data. More specifically, the example depicts a data structure describing bird species in Colorado. The data structure has a temporal attribute provided as element 641. The data structure 620 comprises six columns of data, describing scientific name 642, common name 643, global rank 644, CO state rank 645, federal sensitive 646, and CO state sensitive 647. The data structure 640 may form a part of the baseline data 221 described in FIG. 2.

FIG. 6F shows a diagram of an embodiment of a data structure 650 for geological data. More specifically, the example depicts a data structure describing surficial geology. The data structure 650 comprises five columns of data, describing map title 652, author(s) and date 653, map scale 654, downloadable file formats 655, and notes 656. The data structure 620 may form a part of the baseline data 221 described in FIG. 2.

FIG. 6G shows a diagram of an embodiment of a data structure 660 for asset data (engineering designs, development plans, intangible cultural compositions, etc.). More specifically, the example depicts a data structure describing Ute tribe songs. The data structure has a temporal attribute provided as element 661. The data structure 660 comprises five columns of data, describing name 662, performer 663, people 664, description 665, and attachment 666. The data structure 660 may form a part of the baseline data 221 described in FIG. 2. Furthermore, the data structure 660 is an example of the type of data that a user may request as part of an augmented reality view wherein additional user-selected data is displayed as an overlay.

FIG. 6H shows a diagram of an embodiment of a data structure 680 for media or news coverage (traditional media, blogs, social media, etc.). The data structure 680 comprises three columns of data, describing channel 682, publication time 683, and title 684. The data structure 680 may form a part of the baseline data 221 described in FIG. 2.

FIGS. 7A-B and 8A-B depict authentication services and authorization services, respectively, provided by the client manager.

Figure 7A:
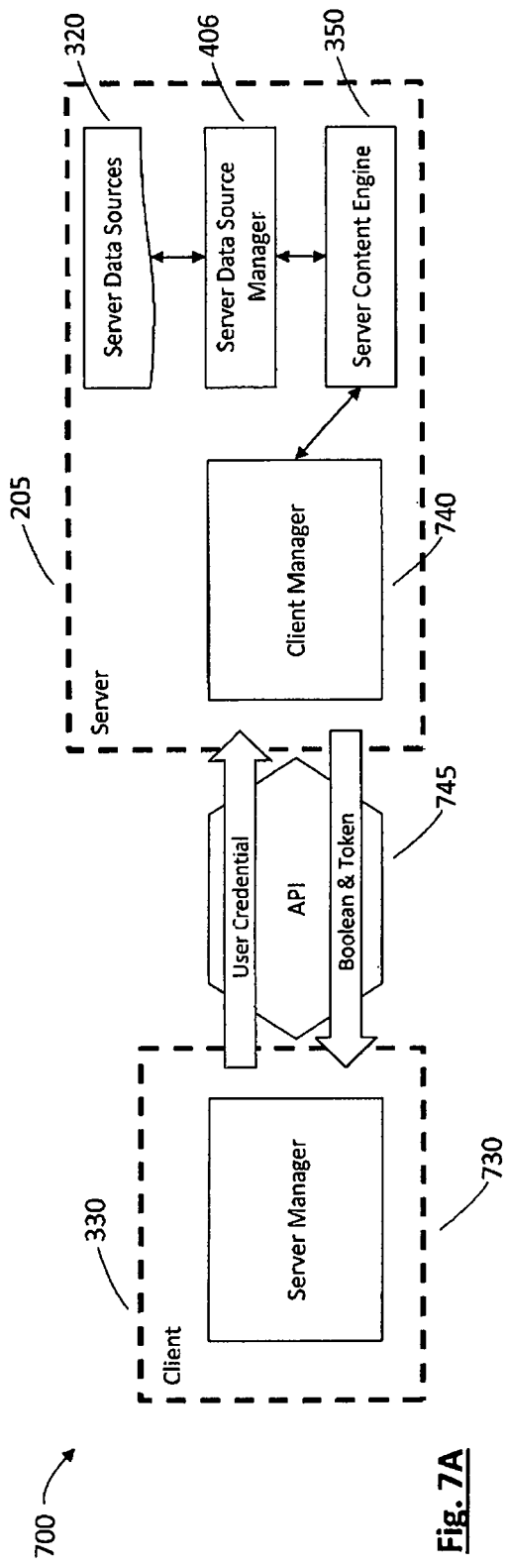
FIG. 7A shows an overview of aspects of authentication by way of the client manager element of a system for interactive resource management according to embodiments of the present disclosure.
Figure 7B:
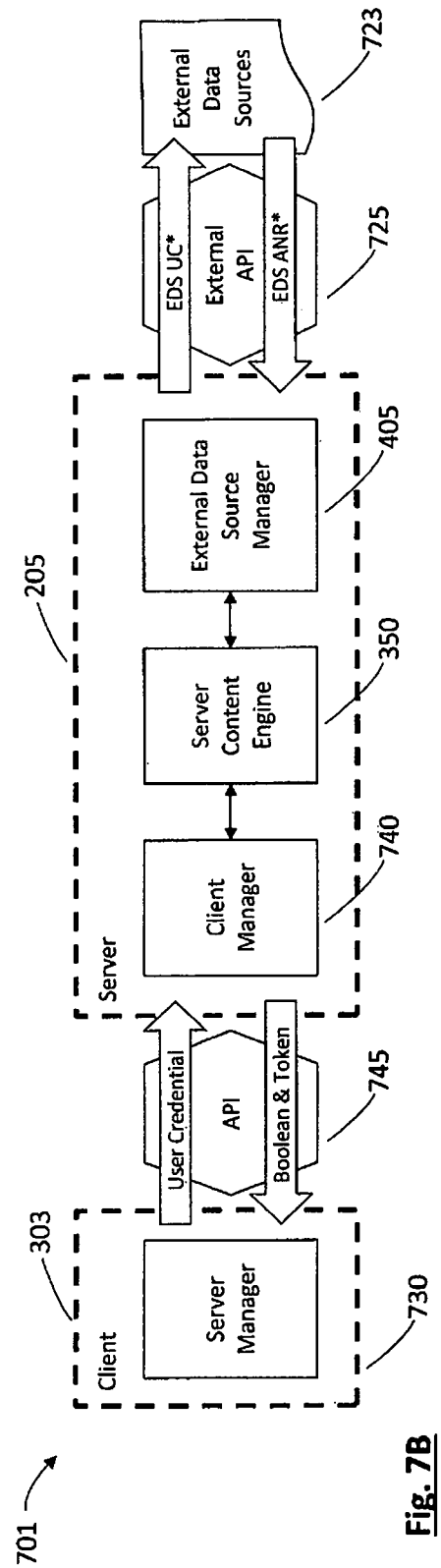
FIG. 7B shows an overview of additional aspects of authentication by way of the client manager element of a system for interactive resource management according to embodiments of the present disclosure.

With attention to FIGS. 7A-B, the client manager 740 is depicted providing authentication of a client 730 user. In FIG. 7A, a client 730 is seeking to authenticate to a server resource by using a "token" passed between the client manager 740 and a client 730 user to be used in further communication. In FIG. 7B, a client 730 is seeking to authenticate to an external resource—an external server/database 723. The authentication occurs via API 745 after the client 730 user enters credentials to access a process/domain. User credentials include username and password in one embodiment. Methods, such as Multi-Factor Authentication, may be used to authenticate users in other embodiments. When authentication to external resources is requested by a client 740, and the client manager 740 is not delegated to perform the authentication task, the client manager relies on the resource owner for authentication. Authentication to an external resource (e.g. the external server/database 723 of FIG. 7B) uses an external API 725 as depicted in FIG. 7B. Note that in FIG. 7B, "EDS UC" means External Data Source's User Credential and "EDS ANR" means External Data Source's AutheNtication Result.

Figure 8A:
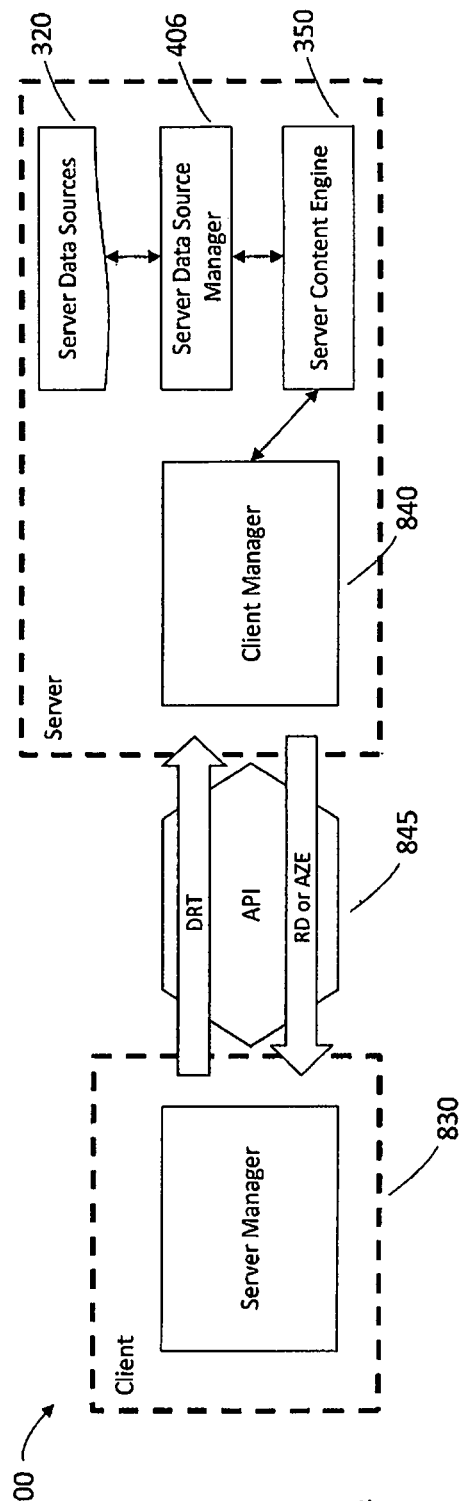
FIG. 8A shows an overview of aspects of authorization by way of the client manager element of a system for interactive resource management according to embodiments of the present disclosure.
Figure 8B:
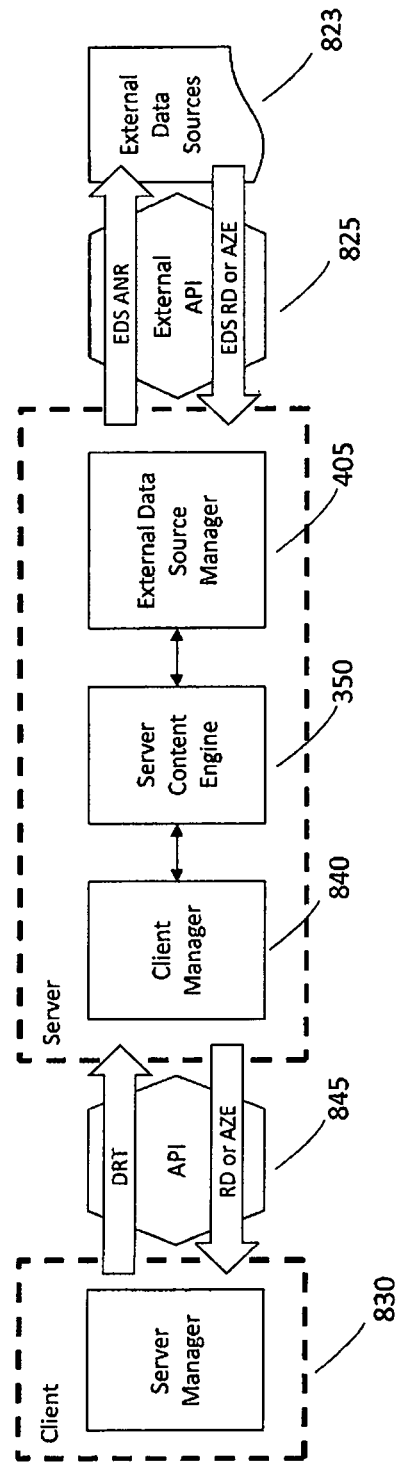
FIG. 8B shows an overview of additional aspects of authorization by way of the client manager element of a system for interactive resource management according to embodiments of the present disclosure.

With attention to FIGS. 8A-B, the client manager 840 is depicted providing authorization of a client 830 user. In FIG. 8A, a client 830 is seeking access to a server resource. In FIG. 8B, a client 830 is seeking access to an external resource—an external server/database 823. The authorization occurs via API 845 after the client 830 user has been authenticated and requests use of a resource. This resource could be a process, data, or something else. When external resources need to be accessed and the client manager 840 is not delegated to perform the authorization task, the client manager 840 relies on the resource owner for authorization. Usually the same credentials entered for authentication are used for authorization. Access to an external resource (e.g. the external server/database 823 of FIG. 8B) uses an external API 825 as depicted in FIG. 8B. Note that the client 830 user request for authorization involves use of a Resource Authorization Request (RAR). Note that in FIGS. 8A-B, "DRT" means Data Request and Token, "RD or AZE" means Requested Data or AuthoriZation Error, "EDS ANR" means External Data Source's AutheNtication Result, and "EDS RD or AZE" means External Data Source's Requested Data or AuthoriZation Error."

Figure 9:
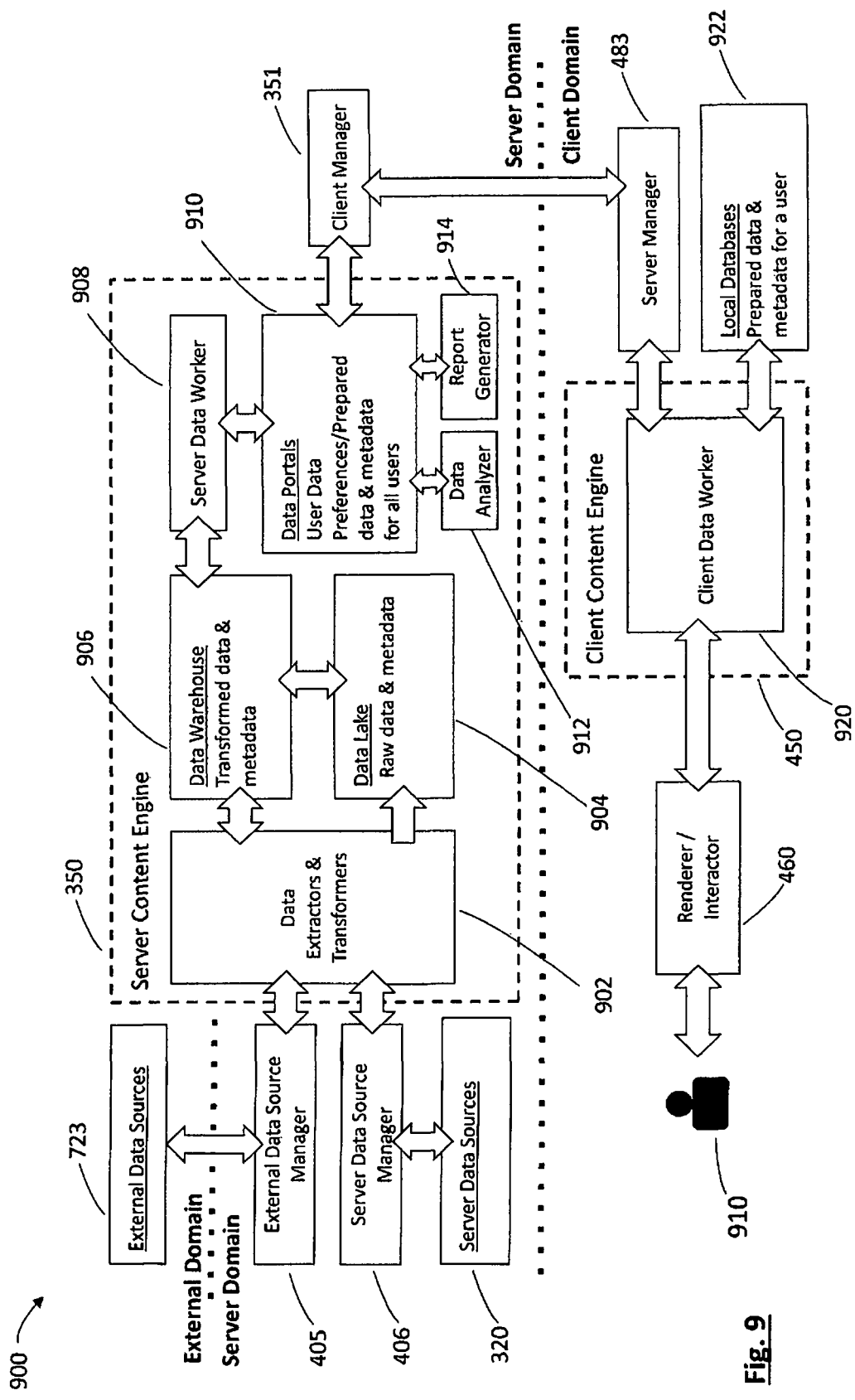
FIG. 9 shows additional detail of the server and client content engine components of a system for interactive resource management.

With attention to FIG. 9, further details of the server content engine 350 and client content engine 450 components of a system 900 for interactive resource management are depicted.

External data source 723 comprise structured, semi-structured, and unstructured data sources managed by external parties and hosted on external servers. The external data source manager 405 communicates with the external data source 723. A server data source manager 406 communicates with the server data sources 320. The server data sources 320 comprise structured, semi-structured, and unstructured data sources managed internally and hosted on internal servers.

A data extractor and transformer 902 is created specifically for each instance of a data source. The data extractor and transformer 902 extracts needed data from a given data source and transforms that data from the original format to that used in the server content engine 350. A copy of the data in its original format is saved in the data lake 904, and the transformed data is categorized and stored in the data warehouse 906. The server data worker 908 moves data between the data warehouse 906 and the data portal 910 based on the user's data preference. The data portal 910 stores the prepared data of a specific user 910.

The data analyzer 912 automates the basic and advanced analysis on a user's data. For example, a basic analysis refers to the statistics and summary of the user data, while an advanced analysis refers to interpreting the data and projecting future trends, events, and behaviors. The report generator 914 produces reports on the analysis.

The client manager 951, in the server domain, and the server manager 483, in the client domain, establish and maintain the communication between the server and the client. The client data worker 920 manages the received prepared data at the local databases 922 and interacts with the renderer and the interactor 460 to coordinate the data for the user's consumption.

Figure 11:
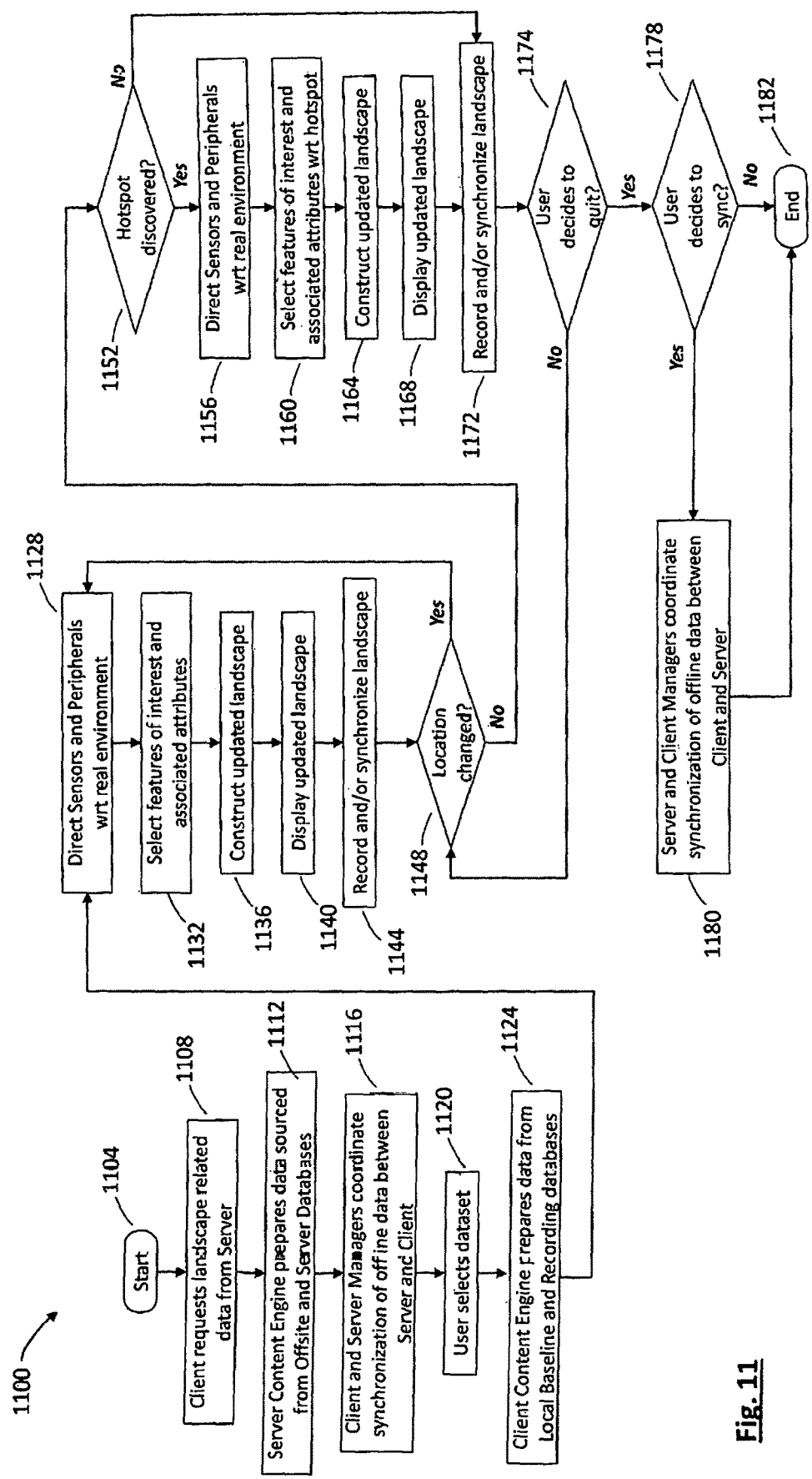
FIG. 11 shows a flowchart of a method of use for interactive resource management according to embodiments of the present disclosure.
Figure 12:
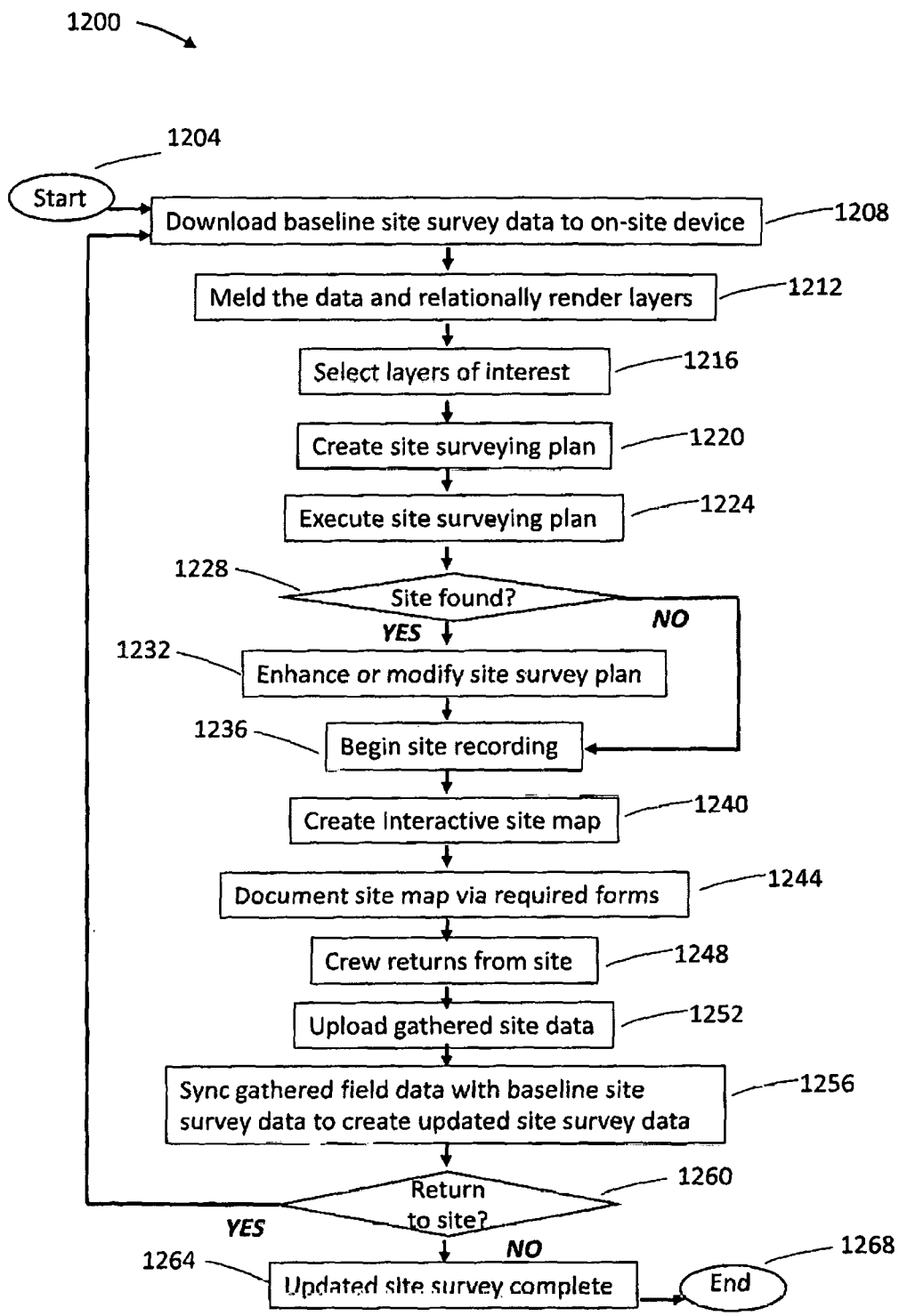
FIG. 12 shows a flowchart of another embodiment of a method of use for interactive resource management.
Figure 13:
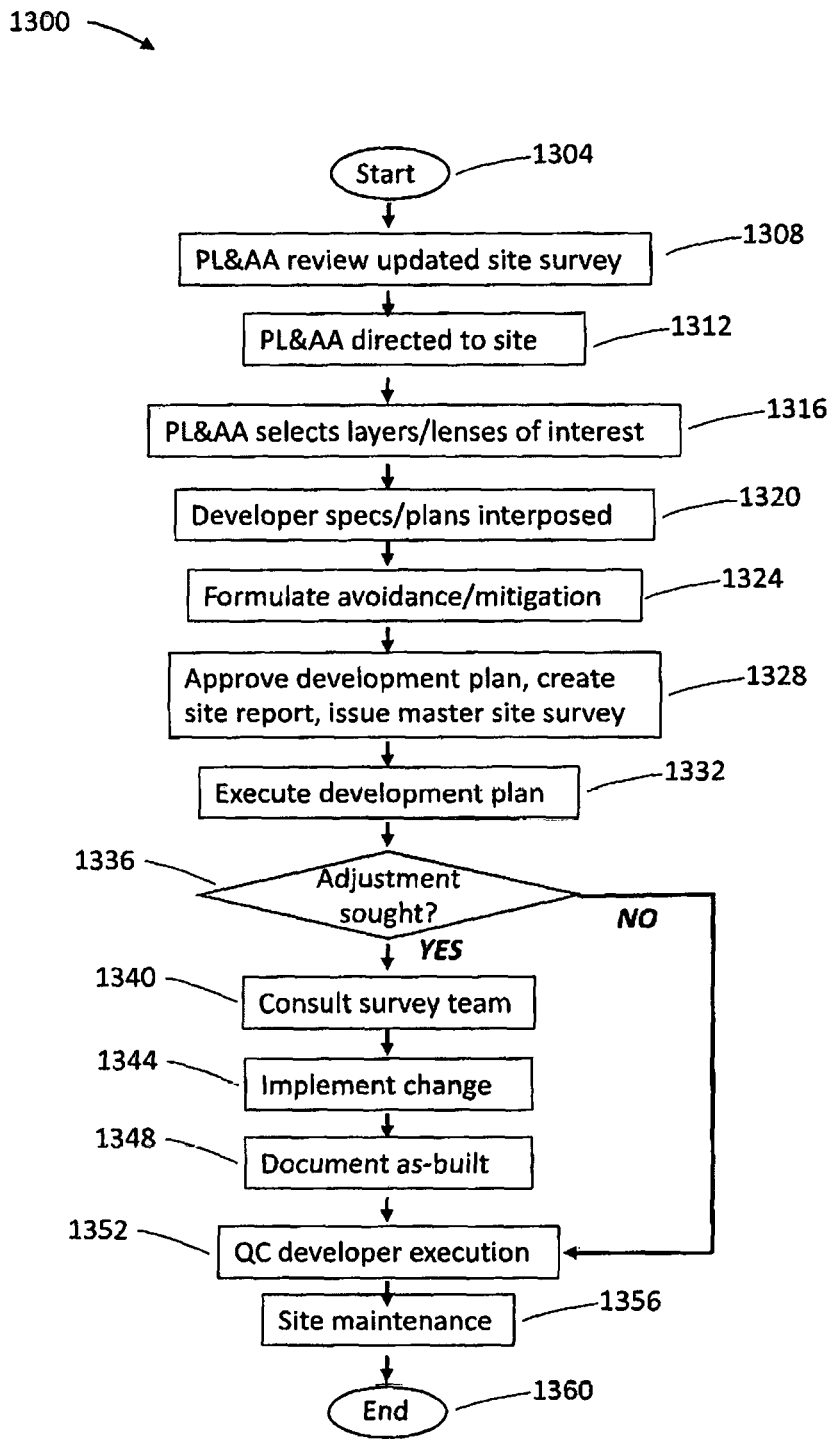
FIG. 13 shows a flowchart of another embodiment of a method of use for interactive resource management.

FIGS. 11-13 depict flowcharts of methods of use for interactive resource management. The methods of use of FIGS. 11-13 will be described with reference to elements of the previous FIGS. 1-10. Generally, FIG. 11 provides a method use of the interactive resource management system, such as the interactive resource management 200 of FIG. 2. Generally, FIG. 12 provides a method of use of a portion of an interactive resource management system, such as the interactive resource management 200 of FIG. 2 and portions 210, 220, and 230 of FIG. 2. Generally, FIG. 13 provides a method of use of a portion of an interactive resource management system, such as the interactive resource management 200 of FIG. 2 and portions 240, 250, and 260 of FIG. 2.

With attention to FIG. 11, a method of use 1100 of an interactive resource management system is provided, such as that provided above with respect to FIGS. 1-5 and 10. The flowchart or process diagram of FIG. 11 starts at step 1104 and ends at step 1182. Any of the steps, functions, and operations discussed herein can be performed continuously and automatically. In some embodiments, one or more of the steps of the method of use 1100, to include steps of the method 1100, may comprise computer control, use of computer processors, and/or some level of automation. The steps are notionally followed in increasing numerical sequence, although, in some embodiments, some steps may be omitted, some steps added, and the steps may follow other than increasing numerical order. When the method references a user, the user may be one or both of one or more onsite users and one or more offsite users. A user may interact or perform one or more of the described steps be using a display/GUI as described above.

After starting at step 1104, the method 1100 proceeds to step 1108 wherein a client 131 user requests baseline landscape related data from the server 205. The user may define the data request by defining a geographic region, such as the resource landscape and/or site of interest. After completing step 1108, the method proceeds to step 1112 wherein the server content engine 312 prepares the requested data from any of several databases, such as offsite or external databases 323 and server data sources 320. After completing step 1112, the method 1100 proceeds to step 1116.

At step 1116, the client manager 351 and the server manager 483 coordinate synchronization of offline data between the server 205 and the client. After completing step 1116, the method proceeds to step 1120 wherein the user selects a database for investigation, analysis, and/or query. After the method 1100 completes step 1120, the method proceeds to step 1124.

At step 1124, the client content engine 450 prepares data from the local baseline database 341 and the local recording database 342. After completing step 1124, the method proceeds to step 1128 wherein the sensors 1060 and/or peripherals 1052 are directed to one or more targets in the operating environment 590 of the resource landscape and/or site location. The directing of the sensors 1060 and/or peripherals 1052 may be done manually by one or more users located at the resource site or located remote from the resource site, autonomously, or semi-autonomously. After completing step 1128, the method 1100 proceeds to step 1132.

At step 1132, features of interest and/or associated attributes of selected features are identified or selected by way of the rendered/interactor 460. After completion of step 1132, the method 1100 proceeds to step 1136 wherein an updated landscape is constructed. The updated landscape reflects any data gathered during the step 1128 and/or selected at step 1132. After completion of step 1136, the method 1100 proceeds to step 1140 wherein the updated landscape display is displayed in any of several views, as provided by the renderer/interactor 460. After completion of step 1140, the updated landscape may be recorded and/or synchronized at step 1144. After completion of step 1144, the method 110 proceeds to step 1148.

At step 1148, a query is made whether the location has changed. If the reply to the query is Yes, the method 1100 proceeds back to step 1128. If the reply to the query is No, the method 1100 proceeds to step 1152.

At step 1152, a query is made as to whether a hotspot 1091 has been discovered. If the reply is No, the method 1100 jumps down to step 1172. If the reply is Yes, the method 1100 proceeds to step 1156.

At step 1156, the sensors 1060 and/or peripherals 1052 are directed to the hotspot 1091 or to one or more targets associated with the hotspot 1091 of the operating environment 590 of the resource landscape and/or site location. The directing of the sensors 1060 and/or peripherals 1052 may be done manually by one or more users located at the resource site or located remote from the resource site, autonomously, or semi-autonomously. After completing step 1156, the method 1100 proceeds to step 1160.

At step 1160, features of interest and/or associated attributes of selected features of the hotspot 1090 are identified or selected by way of the rendered/interactor 460. After completion of step 1160, the method 1100 proceeds to step 1164 wherein an updated landscape is constructed. The updated landscape reflects any data gathered during the step 1156 and/or selected at step 1160. After completion of step 1164, the method 1100 proceeds to step 1168 wherein the updated landscape display is displayed in any of several views, as provided by the renderer/interactor 460. After completion of step 1168, the updated landscape may be recorded and/or synchronized at step 1172. After completion of step 1172, the method 110 proceeds to step 1174.

At step 1174, the method 1100 queries if the user is finished. If the reply is Yes, the method proceeds to step 1148. If the reply is No, the method 1100 proceeds to step 1178. At step 1178, a query is made if the user would like to sync (the data associated with the resource site). If the reply is no, the method proceeds to step 1182 and the method 1100 ends. If the reply is Yes, the method 1100 proceeds to step 1180 wherein the client manager 351 and the server manager 483 coordinate synchronization of offline data between the server 205 and the client. After completing step 1180, the method 1100 proceeds to step 1182 and the method 1100 ends.

FIGS. 12 and 13 provide a method of use of portions of an interactive resource management system, such as the interactive resource management 200 of FIG. 2. The methods of FIGS. 12 and 13 will draw from an archaeological resource site scenario for illustrative purposes, and do not imply any limitation in the systems and methods of the disclosure. Note that for convenience, in FIGS. 12-13 the term "site" and related phrases, such as "site survey," "site map," "site data" etc. more generally refer to a landscape and/or a site. Recall, as provided previously, that the term "landscape" refers to a large-scale environment, and the term "site" refers to a project area, such as a small-scale or locale environment with a defined project area.

With attention to FIG. 12, a method of use 1200 of an interactive resource management system is provided. The flowchart or process diagram of FIG. 12 starts at step 1204 and ends at step 1268. Any of the steps, functions, and operations discussed herein can be performed continuously and automatically. In some embodiments, one or more of the steps of the method of use 1200, to include steps of the method 1200, may comprise computer control, use of computer processors, and/or some level of automation. The steps are notionally followed in increasing numerical sequence, although, in some embodiments, some steps may be omitted, some steps added, and the steps may follow other than increasing numerical order. When the method references a user, the user may be one or both of one or more onsite users and one or more offsite users. A user may interact or perform one or more of the described steps be using a display/GUI as described above.

After starting at step 1204, the method 1100 proceeds to step 1208, wherein baseline site survey data is downloaded to the on-site device. Stated another way, baseline site resource data are downloaded to the remote site device of a field site user. The data may comprise environmental and cultural data along with historical information. These types of data are considered vital for archaeologists to assess new discoveries. Each archaeologist ensures that the data download is complete and then cached locally. After completing step 1208, the method proceeds to step 1212.

At step 1212, the downloaded data are melded, and layers of the data are relationally rendered, thereby enabling the renderer/interactor 460 to provide a variety of viewing perspectives to the site archaeologists. After completing step 1212, the method 1200 proceeds to step 1216.

At step 1216, the site field crew member users select layers of interest for particular survey tasks or applications. With multiple lenses of data to call upon, the crew members each select relevant environmental data like soil and vegetation type, proximity to water, known cultural landscapes and even chronological models of past ecosystems. First and foremost, they utilize the lenses uniquely associated with their project. With the final lenses selected, a combination that can be unique to any one user, the crew begins their survey of the project area. After completing step 1216, the method 1200 proceeds to step 1220.

At step 1220, the survey crew creates a plan for landscape (e.g. project area) and site surveying, and then begins to execute the survey plan at step 1224, then proceeding to step 1228.

At step 1228, the method queries as to whether a site has been found, aka whether a resource has been found. If the reply is Yes, the method 1200 proceeds to step 1232. If the reply is No, the method 1200 skips to step 1236.

At step 1232, the crew enhances or modifies the survey plan as guided by the displays and features of the app client of the remote site device. For example, the crew immediately falls into a combination of both their traditional work flow and one guided by in-app prompts from the remote site device. The method then proceeds to step 1236, wherein the crew begins to record the site. The method 1200 then proceeds to step 1240, wherein an interactive site map is created. The interactive map of site may be viewed/checked by remote parties.

At step 1240, for example, as the crew fans out using pin flags to denote site features, a technician begins recording the site using the app while tethered to the external GPS device to ensure sub-meter accuracy in mapping, a regulatory requirement. After completing step 1240 (or simultaneous with step 1240), the method proceeds to step 1244 wherein the site is documented via required forms. For example, using a combination of shooting points, walking linear features and strolling to record polygon boundaries, the technician creates an interactive map of the site which can be viewed and edited by their crewmates. Meanwhile, the other crew members begin the required form documentation using the intuitive GUI to record all required data. Rote tasks such as gathering legal locations, taking note of photo orientation, etc. are automated within the app. Thus, the app collects the all supportive or ancillary metadata, saving precious time and eliminating human error. After completing step 1244, the method 1200 proceeds to step 1248 wherein the crew returns from the site and then to step 1252 wherein the gathered site data are uploaded. After completing step 1252, the method 1200 proceeds to step 1256.

At step 1256, the field data are synchronized with baseline site survey data to create updated site survey data. For example, the new geodatabase(s) are synchronized with the company's master database, which is managed by a GIS team. Each day, the GIS team updates the individual geodatabases with new or needed data, and each morning the field crew downloads and caches their specific geodatabase(s) for another day of survey and recording. At the completion of step 1256, the method 1200 proceeds to step 1260, wherein a query is made if the crew needs to return to the site for further site surveying and site data gathering. If the reply is Yes, the method proceeds to step 1208. If the reply is No, the method 1200 proceeds to step 1264 wherein the updated site survey is complete and the method then ends at step 1268.

With attention to FIG. 13, a method of use 1300 of an interactive resource management system is provided. The flowchart or process diagram of FIG. 13 starts at step 1304 and ends at step 1360. Any of the steps, functions, and operations discussed herein can be performed continuously and automatically. In some embodiments, one or more of the steps of the method of use 1300, to include steps of the method 1300, may comprise computer control, use of computer processors, and/or some level of automation. The steps are notionally followed in increasing numerical sequence, although, in some embodiments, some steps may be omitted, some steps added, and the steps may follow other than increasing numerical order. When the method references a user, the user may be one or both of one or more onsite users and one or more offsite users. A user may interact or perform one or more of the described steps be using a display/GUI as described above.

After beginning at step 1304, the method 1300 proceeds to step 1308, wherein a PL&AA, who may be an agency archaeologist, reviews the updated site survey (the end result of method 12, i.e. step 1264 of method 1200). For example, the agency archaeologist may evaluate documented resources that yield "significance" and may or will be affected by development. After completing step 1308, the method 1300 proceeds to step 1312.

At step 1312, the PL&AA, e.g. the agency archaeologist, is directed to the site (aka the resource) by the app. For example, using in-app features, the agency archaeologist can assess the distance and direction to the site and begin advancing towards it. As the agency archaeologist approaches the location, the app begins to reveal more data that places the site into the context of the surrounding natural and cultural landscape. After completing step 1312, the method 1300 proceeds to step 1316, wherein the PL&AA selects layers/lenses of interest, via the App, to quality control (QC) crew survey work and with attention to developer's proposed engineering specs/plans/designs. For example, toggling through various lenses, agency archaeologist(s) may view features and attributes specific to the landscape and/or site, environmental data that provides useful context, and also location of and distance to other known/recorded resources. This revisit serves both as a review of the crew's recommendation of "significance" and also an opportunity for the land-managing agent (the agency archaeologist) to thoroughly understand and better manage resources under their jurisdiction. After completing step 1316, the method 1300 proceeds to step 1320.

At step 1320, the developer-proposed engineering specs/plans/designs are interposed (i.e. a composite is created) with updated landscape and site survey data to assess the potential impact of the development of the site. After completing step 1320, the method 1300 proceeds to step 1324. At step 1324, in collaboration with the developer, the PL&AA formulate avoidance or mitigation strategies to address any identified issues. After completing step 1324, the method 1300 proceeds to step 1328, wherein the development plan is approved and authorized, a site report may be created, and a master landscape and site survey issued. After completing step 1328, the method 1300 proceeds to step 1332, wherein the developer executes the development plan. It is noted that all stakeholders, e.g. the agency archaeologist, the developer, the site crew, etc., have access to a common and comprehensive set of plans, e.g. the landscape and/or site plan and the development plan, ensuring more effective and efficient landscape and site development, resource monitoring, and resource maintenance and management. For example, the developer may log into the app and retrieve both their own proprietary data (e.g. engineering designs for existing and future assets like roads, pipelines, fiber optic lines, etc.) and the cultural and environmental buffers approved by the agency for their use.

During step 1332 or at the completion of step 1332, the method proceeds to step 1336, wherein a query is made if an adjustment to the approved development plan is sought. If the reply is Yes, the method proceeds to step 1336. If the reply is No, the method proceeds to step 1352.

At step 1340, the survey team is consulted as to the adjustment sought. For example, an in-field analysis may reveal how current development engineering plans come in contact with sensitive buffer zones that must be avoided. Using in-app features, the engineering team can develop and consider alternative design plans with real-time, dynamic data. The engineer and survey teams can begin mapping in a new design plan that will be uploaded and eventually synced with their master database, or synced and managed. After completing step 1340, the change sought may be implemented as step 1344, and as-built drawings available immediately in the centralized and updated database of site plans. The creation of as-built drawings is step 1348. After step 1348, the method 1300 proceeds to step 1352 wherein developer execution is quality checked or monitored. For example, in their role as land manager, the agency archaeologists and other specialists field-check construction to ensure that buffer zones are being honored and other resources are not being adversely impacted by construction.

After completion of step 1352, the method 1300 proceeds to step 1356 wherein site maintenance occurs. For example, site maintenance personnel may use the app and associated common site database to quickly revisit and audit assets. Concurrently, the agency now has access to the same "as-built" dataset and can overlay cultural, environmental and other layers not accessible to the developer so they can more efficiently and successfully manage resources under their care. After completion of step 1356, the method 1300 ends at step 1360.

What is claimed is:

1. A system for interactive resource management of a resource site, comprising:
   a server database comprising a baseline dataset, the baseline dataset comprising baseline geospatially-referenced data;
   a remote site device comprising:
      a geolocation device providing a location of the remote site device;
      a surveillance sensor sensing range and direction to a survey target and generating surveillance sensor data associated with the survey target;
      a local database comprising a local dataset, the local dataset comprising the surveillance sensor data and local geospatially-referenced data; and
      a user interface enabling a user to selectively populate the local database with the surveillance sensor data;
      a data synthesizer that combines the baseline dataset with the local dataset to create a set of synthesized datasets, each of the synthesized datasets identified with a temporal epoch; and
      a renderer configured to present a plurality of views of each of the set of synthesized datasets using the user interface;
   wherein:
   the plurality of views of the synthesized dataset include a temporally referenced view;
   the user selects a particular synthesized dataset by selecting the temporal epoch identified with the particular synthesized dataset;
   the resource site is a geospatially identifiable site location; and
   the user performs interactive resource management of the resource site using the particular synthesized dataset rendered on the user interface.

2. The system of claim 1, the remote site device further comprising a camera producing a camera, view of the resource site on the user interface, wherein the renderer presents a feature of the baseline geospatially-referenced data within the camera view to create an augmented reality view.

3. The system of claim 1, wherein the resource site is an archaeological site.

4. The system of claim 1, wherein the renderer presents an attribute associated with the survey target on the user interface to create an augmented reality view.

5. The system of claim 1, wherein the plurality of views are rendered as a sequence of views.

6. The system of claim 5, wherein the sequence of views are defined by time steps, the time steps selected by the user by way of the user interface.

7. The system of claim 1, wherein one of the plurality of views of the synthesized dataset is a map-based view.

8. The system of claim 1, wherein one of the plurality of views of the synthesized dataset is a virtual-reality, view or an augmented reality view.

9. The system of claim 1, the remote site device further configured to record one or more of the plurality of views of the synthesized dataset.

10. The system of claim 1, the remote site device further configured to create an interactive map of the resource site wherein the user is a user located at the resource site or a user located remote from the resource site.

11. The system of claim 1, wherein the baseline geospatially-referenced dataset comprises developer engineering specifications associated with the resource site.

12. The system of claim 1, wherein the local geospatially-referenced data includes data associated with at least two of: climate data, historical data, biological data, geological data, and asset data.

13. The system of claim 1, wherein the local geospatially-referenced data includes data comprising data associated with geological data and asset data.

14. The system of claim 13, wherein the surveillance sensor comprises a spherical camera and the plurality of views comprise an augmented reality view and a virtual reality view.

15. A method for interactive asset management comprising:
- accessing a server database comprising a baseline dataset, the baseline dataset comprising baseline geospatially-referenced data associated with an asset location of an asset;
- providing a remote site device comprising a geolocation device, at least one surveillance sensor, a user interface, and a local database, the local database comprising local geospatially-referenced data;
- directing the at least one surveillance sensor within the asset location to create surveillance sensor data associated with the asset;
- synthesizing the surveillance sensor data with the baseline dataset to create a set of synthesized datasets, each of the synthesized datasets identified with a temporal epoch;
- rendering each of the set of synthesized datasets on the user interface; and
- selecting a particular synthesized dataset by selecting a particular temporal epoch identified with the particular synthesized dataset.

16. The method of claim 15, further comprising the step of selecting an artifact point associated with the particular temporal epoch and rendering data associated with the artifact point on the user interface.

17. The method of claim 15, wherein the synthesized dataset is broadcast to a location remote from the resource location.

18. The method of claim 15, wherein the surveillance sensor is a plurality of sensors comprising a spherical camera.

19. An interactive resource management system for an archaeological resource site, comprising:
- a server database comprising a baseline dataset, the baseline dataset comprising baseline geospatially-referenced data;
- a remote site device comprising:
  - a geolocation device providing a location of the remote site device;
  - a plurality of surveillance sensors measuring range and direction to a survey target and generating surveillance sensor data associated with the survey target;
  - a visible band camera;
  - a local database comprising a local dataset, the local dataset comprising the surveillance sensor data and local geospatially-referenced data; and
  - a user interface receiving input from a user to direct the surveillance sensor at the survey target and to populate the local database with the surveillance sensor data;
- a data synthesizer that combines the baseline dataset with the local dataset to create a set of synthesized datasets, each of the synthesized datasets identified with a temporal epoch; and
- a renderer presenting a plurality of views of each of the set of synthesized datasets using the user interface, the plurality of views comprising an augmented reality view; wherein:
  - the user views the plurality of views of the synthesized dataset on the user interface;
  - the user selects a particular synthesized dataset by selecting the temporal epoch identified with the particular synthesized dataset; and
  - the user selects an artifact point associated with the particular temporal epoch and renders data associated with the artifact point on the user interface.

20. The interactive resource management system of claim 19, wherein:
- the artifact point is associated with an archaeological GIS recording; and
- the renderer presents a plurality of views in a sequence of time steps, the time steps selectable by a user.

* * * * *